United States Patent
Wu et al.

(10) Patent No.: US 12,177,470 B2
(45) Date of Patent: Dec. 24, 2024

(54) INTERPOLATION FILTER TRAINING METHOD AND APPARATUS, VIDEO PICTURE ENCODING AND DECODING METHOD, AND ENCODER AND DECODER

(71) Applicants: Huawei Technologies Co., Ltd., Shenzhen (CN); University of Science and Technology of China, Hefei (CN)

(72) Inventors: Feng Wu, Hefei (CN); Ning Yan, Hefei (CN); Dong Liu, Hefei (CN); Houqiang Li, Hefei (CN); Haitao Yang, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 77 days.

(21) Appl. No.: 17/221,184

(22) Filed: Apr. 2, 2021

(65) Prior Publication Data

US 2021/0227243 A1      Jul. 22, 2021

Related U.S. Application Data

(63) Continuation of application No. PCT/CN2019/108311, filed on Sep. 26, 2019.

(30) Foreign Application Priority Data

Oct. 6, 2018   (CN) .................. 201811166872.X

(51) Int. Cl.
*H04N 19/51* (2014.01)
*H04N 19/176* (2014.01)
(Continued)

(52) U.S. Cl.
CPC ........... *H04N 19/51* (2014.11); *H04N 19/176* (2014.11); *H04N 19/42* (2014.11); *H04N 19/80* (2014.11)

(58) Field of Classification Search
CPC .. H04N 19/117; H04N 19/147; H04N 19/176; H04N 19/42; H04N 19/51; H04N 19/59; H04N 19/80
See application file for complete search history.

(56) References Cited

U.S. PATENT DOCUMENTS

2004/0062307 A1*   4/2004   Hallapuro ............ H04N 19/159
                                                              375/240.16
2004/0076333 A1     4/2004   Zhang et al.
(Continued)

FOREIGN PATENT DOCUMENTS

CN           1666429 A       9/2005
CN         101043621 A       9/2007
(Continued)

OTHER PUBLICATIONS

"Line Transmission of Non-Telephone Signals, Video Codec for Audiovisual Services at px64 kbit/s," ITU-T H.261 (Mar. 1993), , total 32 pages, International Telecommunication Union, Geneva, Switzerland (1990).

(Continued)

*Primary Examiner* — Jessica M Prince
(74) *Attorney, Agent, or Firm* — Leydig, Voit & Mayer, Ltd.

(57) ABSTRACT

Embodiments of this application disclose an interpolation filter training method and apparatus, a video picture encoding and decoding method, an encoder, and a decoder. According to the training method, a first sub-pixel picture obtained through interpolation by using a conventional interpolation filter is used as label data, to train a second interpolation filter, so that the second interpolation filter obtained through training can be directly used for a pixel value, obtained through interpolation, of a first fractional pixel position. Therefore, the label data is more accurate, and coding performance of a video picture is improved.

(Continued)

According to the encoding method, during inter prediction, a target interpolation filter used for a current encoding picture block is determined from a set of candidate interpolation filters, and the encoder selects, according to content of the current encoding picture block, an appropriate interpolation filter to perform an interpolation operation.

11 Claims, 16 Drawing Sheets

(51) Int. Cl.
*H04N 19/42* (2014.01)
*H04N 19/80* (2014.01)

(56) References Cited

U.S. PATENT DOCUMENTS

| | | | |
|---|---|---|---|
| 2004/0181564 | A1 | 9/2004 | MacInnis et al. |
| 2010/0111182 | A1* | 5/2010 | Karczewicz ......... H04N 19/192 |
| | | | 375/E7.076 |
| 2010/0220788 | A1 | 9/2010 | Wittmann et al. |
| 2011/0080953 | A1 | 4/2011 | Francois et al. |
| 2012/0093217 | A1* | 4/2012 | Jeon ..................... H04N 19/176 |
| | | | 375/E7.125 |
| 2015/0195558 | A1* | 7/2015 | Kim ....................... H04N 19/58 |
| | | | 375/240.16 |
| 2016/0191946 | A1 | 6/2016 | Zhou et al. |
| 2016/0366422 | A1* | 12/2016 | Yin ....................... H04N 19/167 |
| 2018/0098066 | A1* | 4/2018 | Lee ......................... H04N 19/59 |
| 2020/0236362 | A1* | 7/2020 | Lee ....................... H04N 19/176 |

FOREIGN PATENT DOCUMENTS

| | | |
|---|---|---|
| CN | 101198063 A | 6/2008 |
| CN | 101616325 A | 12/2009 |
| CN | 101790092 A | 7/2010 |
| CN | 102084655 A | 6/2011 |
| CN | 102638678 A | 8/2012 |
| CN | 103875246 A | 6/2014 |
| CN | 108012157 A | 5/2018 |
| JP | 2004147328 A | 5/2004 |
| JP | 2011523326 A | 8/2011 |
| JP | 2012070153 A | 4/2012 |
| JP | 2012080162 A | 4/2012 |
| WO | 2017052409 A1 | 3/2017 |
| WO | WO-2017052409 * | 3/2017 |

OTHER PUBLICATIONS

"Series H: Audiovisual and Multimedia Systems, Infrastructure of audiovisual services—Coding of moving video, Video coding for low bit rate communication," ITU-T H.263 (Jan. 2005), total 226 pages, International Telecommunication Union, Geneva, Switzerland (Jan. 2005).

"Series H: Audiovisual and Multimedia Systems, Infrastructure of audiovisual services—Coding of moving video, Advanced video coding for generic audiovisual services," ITU-T H.264(Apr. 2017), total 812 pages, International Telecommunication Union, Geneva, Switzerland (Apr. 2017).

"Series H: Audiovisual and Multimedia Systems Infrastructure of audiovisual services—Coding of moving video, High efficiency video coding," ITU-T H.265(Feb. 2018), total 692 pages, International Telecommunication Union, Geneva, Switzerland (Feb. 2018).

Matsuo et al., "CE3: LCU-based adaptive interpolation filter," Joint Collaborative Team on Video Coding (JCT-VC) of ITU-T SG16 WP3 and ISO/IEC JTC1/SC29/WG11, 7th Meeting: Geneva, CH, JCTVC-G258_r1, Total 19 pages, International Union of Telecommunication, Geneva, Switzerland, (Nov. 21-30, 2011).

Yan et al., "A Convolutional Neural Network Approach for Half-Pel Interpolation in Video Coding," IEEE International Symposium on Circuits and Systems, Total 6 pages, Institute of Electrical and Electronics Engineers, New York, New York (Sep. 2017).

CN/201811166872.X, Office Action and Search Report, Feb. 28, 2023.

* cited by examiner

FIG. 4

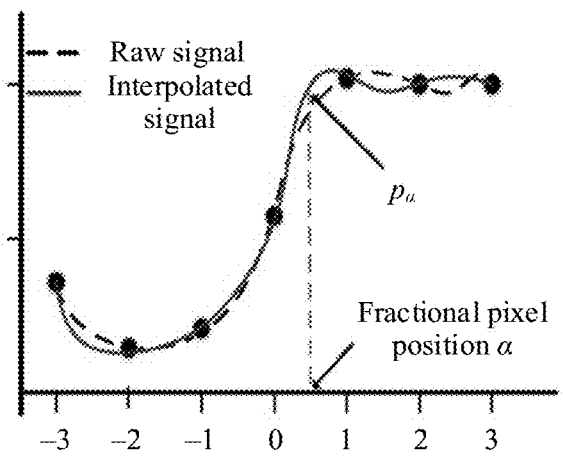
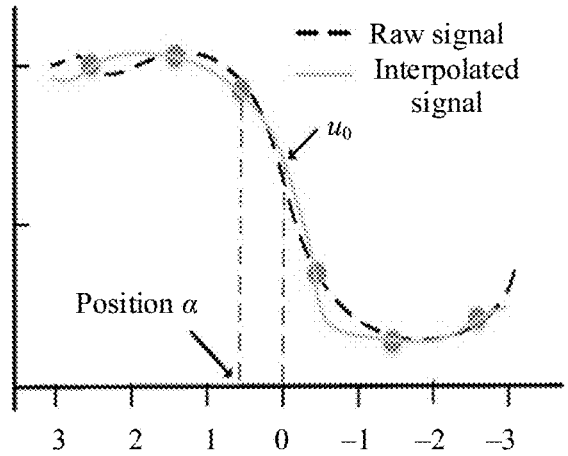

FIG. 5(a)      FIG. 5(b)

S612: Perform interpolation on a pixel, of a sample picture, at an integer pixel position by using a first interpolation filter, to obtain a first sub-pixel picture of the sample picture at a first fractional pixel position

↓

S614: Input the sample picture into a second interpolation filter, to obtain a second sub-pixel picture

↓

S616: Determine a filter parameter of the second interpolation filter by minimizing a first function that is used to represent a difference between the first sub-pixel picture and the second sub-pixel picture

FIG. 6A

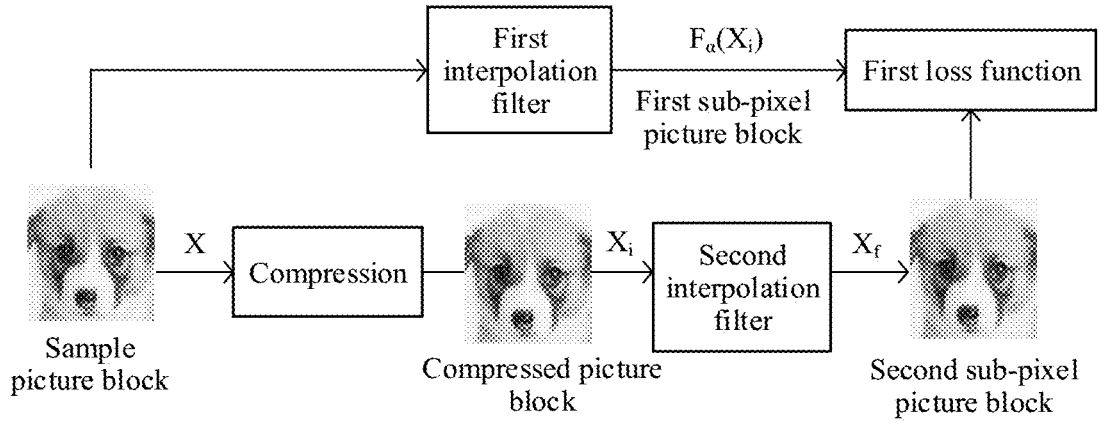

FIG. 6B

S622: Perform sub-pixel interpolation on a sample picture by using a first interpolation filter, to obtain a first sub-pixel picture of the sample picture at a first fractional pixel position

↓

S624: Input the sample picture into a second interpolation filter, to obtain a second sub-pixel picture

↓

S626: Input, to a third interpolation filter, the second sub-pixel picture on which a flipping operation is performed, to obtain a first picture, and perform an inverse operation of the flipping operation on the first picture to obtain a second picture, where the second interpolation filter and the third interpolation filter share a filter parameter

↓

S628: Determine the filter parameter based on a first function that is used to represent a difference between the first sub-pixel picture and the second sub-pixel picture and a second function that is used to represent a difference between the sample picture and the second picture

FIG. 6C

INTERPOLATION FILTER TRAINING METHOD AND APPARATUS, VIDEO PICTURE ENCODING AND DECODING METHOD, AND ENCODER AND DECODER

CROSS-REFERENCE TO RELATED APPLICATIONS

This application is a continuation of International Application No. PCT/CN2019/108311, filed on Sep. 26, 2019, which claims priority to Chinese Patent Application No. 201811166872.X, filed on Oct. 6, 2018. The disclosures of the aforementioned applications are hereby incorporated by reference in their entireties.

TECHNICAL FIELD

This application relates to the field of video coding technologies, and in particular, to an interpolation filter training method and apparatus, a video picture encoding and decoding method, an encoder, and a decoder.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (also referred to as "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 part 10 advanced video coding (AVC), the video coding standard H.265/high efficiency video coding (HEVC) standard, and extensions of such standards. The video apparatuses can transmit, receive, encode, decode, and/or store digital video information more efficiently by implementing the video compression technologies.

The video compression technologies are used to perform spatial (intra-picture) prediction and/or temporal (inter-picture) prediction to reduce or remove inherent redundancy in video sequences. In block-based video coding, a video slice (namely, a video frame or a part of a video frame) may be partitioned into picture blocks, and the picture block may also be referred to as a tree block, a coding unit (CU), and/or a coding node. A picture block in a to-be-intra-coded (I) slice of a picture is coded through spatial prediction based on a reference sample in a neighboring block in the same picture. For a picture block in a to-be-inter-coded (P or B) slice of a picture, spatial prediction based on a reference sample in a neighboring block in the same picture or temporal prediction based on a reference sample in another reference picture may be used. A picture may be referred to as a frame, and the reference picture may be referred to as a reference frame.

Various video coding standards including the high efficiency video coding (HEVC) standard propose a predictive coding mode used for a picture block. To be specific, a current to-be-coded block is predicted based on a coded video data block. In an intra prediction mode, a current block is predicted based on one or more previously decoded neighboring blocks in a same picture as the current block. In an inter prediction mode, a current block is predicted based on a decoded block in a different picture.

However, in the inter prediction mode, when a motion vector points to a sub-pixel, sub-pixel interpolation needs to be performed on an optimal matched reference block. In conventional technologies, an interpolation filter with a fixed coefficient is typically used to perform sub-pixel interpolation, but prediction accuracy is poor for current various non-stationary video signals. Consequently, coding performance of a video picture is poor.

SUMMARY

Embodiments of this application provide an interpolation filter training method and apparatus, a video picture encoding and decoding method, an encoder, and a decoder, to improve prediction accuracy of motion information of a picture block, and further improve coding performance.

According to a first aspect, an embodiment of this application provides an interpolation filter training method. The method includes: A computing device performs interpolation on a pixel, of a sample picture, at an integer pixel position by using a first interpolation filter, to obtain a first sub-pixel picture of the sample picture at a first fractional pixel position; inputs the sample picture into a second interpolation filter, to obtain a second sub-pixel picture; and
  the computer device determines a filter parameter of the second interpolation filter by minimizing a first function that is used to represent a difference between the first sub-pixel picture and the second sub-pixel picture.

It can be learned that in this embodiment of this application, the first sub-pixel picture obtained through interpolation by using a conventional interpolation filter is used as label data, to train the second interpolation filter, so that the second interpolation filter obtained through training can be directly used for a pixel value, obtained through interpolation, of the first fractional pixel position. Therefore, the label data is more accurate, and coding performance of a video picture is improved. In addition, when the second interpolation filter based on a neural network is used as a nonlinear filter to perform prediction, prediction accuracy is high for complex video signals, and therefore coding performance of the video picture is further improved.

According to a second aspect, an embodiment of this application further provides an interpolation filter training method. The method includes: A computing device performs interpolation on a pixel, of a sample picture, at an integer pixel position by using a first interpolation filter, to obtain a first sub-pixel picture of the sample picture at a first fractional pixel position; inputs the sample picture into a second interpolation filter, to obtain a second sub-pixel picture: inputs, to a third interpolation filter, the second sub-pixel picture on which a flipping operation is performed, to obtain a first picture, and performs an inverse operation of the flipping operation on the first picture to obtain a second picture, where the second interpolation filter and the third interpolation filter share a filter parameter; and determines the filter parameter based on a first function that is used to represent a difference between the first sub-pixel picture and the second sub-pixel picture and a second function that is used to represent a difference between the sample picture and the second picture.

It can be learned that, in this embodiment of the present disclosure, sub-pixel interpolation is performed on the sample picture by using a conventional interpolation filter to obtain the first sub-pixel picture, and the first sub-pixel picture is used as label data. By using an invertibility principle of sub-pixel interpolation, the filter parameter is determined by minimizing both the first function that is used to represent the difference between the first sub-pixel picture and the second sub-pixel picture and the second function that is used to represent the difference between the sample picture and the second picture, so that the second interpolation filter is constrained by monitoring the sample picture. This improves accuracy of sub-pixel interpolation by using the second interpolation filter, and further improves coding performance of a video picture.

Optionally, implementations in which the computing device determines the filter parameter based on the first function that is used to represent the difference between the first sub-pixel picture and the second sub-pixel picture and the second function that is used to represent the difference between the sample picture and the second picture may include but not limited to the following two implementations.

First implementation: The computing device determines the filter parameter by minimizing a third function, where the third function is a weighted sum between the first function that is used to represent the difference between the first sub-pixel picture and the second sub-pixel picture and the second function that is used to represent the difference between the sample picture and the second picture.

Second implementation: The computing device determines the filter parameter by alternately minimizing a first loss function that is used to represent the difference between the first sub-pixel picture and the second sub-pixel picture and the second function that is used to represent the difference between the sample picture and the second picture.

It should be understood that the computing device in the first aspect and the second aspect may be an encoding device or a compression device, and the foregoing device may be a device having a data processing function, such as a computer, a server, or a terminal (for example, a mobile phone or a tablet computer).

According to a third aspect, an embodiment of this application further provides a video picture encoding method. The method includes the following:

An encoder performs inter prediction on a current encoding picture block to obtain motion information of the current encoding picture block, where the motion information of the current encoding picture block points to a fractional pixel position, and the inter prediction process includes: determining, from a set of candidate interpolation filters, a target interpolation filter used for the current encoding picture block.

The encoder encodes the current encoding picture block based on an inter prediction mode of the current encoding picture block and the motion information of the current encoding picture block to obtain encoding information, and encodes the encoding information into a bitstream, where the encoding information includes indication information of the target interpolation filter, and the indication information of the target interpolation filter is used to indicate to perform sub-pixel interpolation by using the target interpolation filter to obtain a reference block of a fractional pixel position corresponding to the current encoding picture block.

According to a fourth aspect, an embodiment of this application further provides a video picture encoding method. The method includes the following:

An encoder performs inter prediction on a current encoding picture block to obtain motion information of the current encoding picture block, where the motion information of the current encoding picture block points to a fractional pixel position, and the inter prediction process includes: determining, from a set of candidate interpolation filters, a target interpolation filter used for the current encoding picture block.

The encoder encodes the current encoding picture block based on an inter prediction mode of the current encoding picture block and the motion information of the current encoding picture block to obtain encoding information, and encodes the encoding information into a bitstream, where if the inter prediction mode of the current encoding picture block is a target inter prediction mode, the encoding information does not include indication information of the target interpolation filter: or if the inter prediction mode of the current encoding picture block is not a target inter prediction mode, the encoding information includes indication information of the target interpolation filter, where the indication information of the target interpolation filter is used to indicate that the current encoding picture block uses the target interpolation filter to perform sub-pixel interpolation.

It can be learned that in this embodiment of this application, when performing inter prediction, the encoder may select, based on content of the current encoding picture block, an interpolation filter to perform an interpolation operation, to obtain a prediction block with higher prediction accuracy, reduce a quantity of bitstreams, and increase a compression rate of a video picture.

It should be understood that the encoder in the third aspect or the fourth aspect may be an encoding device including the encoder, and the encoding device may be a device having a data processing function, such as a computer, a server, or a terminal (for example, a mobile phone or a tablet computer).

With reference to the third aspect or the fourth aspect, in a possible implementation of this embodiment of this application, an implementation in which the encoder determines, from the set of candidate interpolation filters, the target interpolation filter used for the current encoding picture block may be as follows: The encoder determines, from the set of candidate interpolation filters according to a rate-distortion cost criterion, the target interpolation filter used for the current encoding picture block.

It can be learned that, when performing inter prediction, the encoder may select, based on the content of the current encoding picture block, an interpolation filter with a smallest rate-distortion cost to perform an interpolation operation, to improve prediction accuracy, reduce a quantity of bit-streams, and increase a compression rate of a video picture.

With reference to the third aspect or the fourth aspect, in a possible implementation of this embodiment of this application, an implementation in which the encoder performs inter prediction on the current encoding picture block to obtain the motion information of the current encoding picture block may be as follows:

The encoder determines an integer pixel reference picture block that optimally matches the current encoding picture block.

The encoder performs sub-pixel interpolation on the integer pixel reference picture block by using each interpolation filter in the set of candidate interpolation filters, to obtain N sub-pixel reference picture blocks, where N is a positive integer.

The encoder determines, from the integer pixel reference picture block and the N sub-pixel reference picture blocks, a prediction block that optimally matches the current encoding picture block.

The encoder determines the motion information based on the prediction block, where an interpolation filter that is used to obtain the prediction block through interpolation is the target interpolation filter.

It can be learned that, during inter prediction, the encoder may select an interpolation filter corresponding to a reference block with a smallest distortion cost to perform interpolation, so as to reduce a quantity of bitstreams and increase a compression rate of a video picture.

With reference to the third aspect or the fourth aspect, in a possible implementation of this embodiment of this application, the set of candidate interpolation filters includes the second interpolation filter obtained by using the interpolation filter training method according to the first aspect or the second aspect.

Optionally, if the target interpolation filter is the second interpolation filter obtained by using the interpolation filter training method according to the first aspect or the second aspect, a filter parameter of the target interpolation filter is a preset filter parameter, or a filter parameter of the target interpolation filter is the filter parameter obtained by using the interpolation filter training method according to the first aspect or the second aspect.

Further, the encoding information further includes the filter parameter of the target interpolation filter obtained through training: or the encoding information further includes a filter parameter difference, and the filter parameter difference is a difference between a filter parameter of a target interpolation filter that is used for a current picture unit and that is obtained through training and a filter parameter of a target interpolation filter that is used for a previously encoded picture unit and that is obtained through training.

It can be learned that the encoder may perform online training on the second interpolation filter in the set of candidate interpolation filters, so that the interpolation filter can be adjusted in real time based on content of the current encoding picture unit, thereby improving prediction accuracy.

Optionally, a picture unit includes a picture frame, a slice (slice), a video sequence subgroup, a coding tree unit (CTU), a coding unit (CU), or a prediction unit (PU).

According to a fifth aspect, an embodiment of this application further provides a video picture decoding method. The method includes the following:

A decoder parses a bitstream to obtain indication information of a target interpolation filter.

The decoder obtains motion information of a current decoding picture block, where the motion information points to a fractional pixel position.

The decoder performs a prediction process on the current decoding picture block based on the motion information of the current decoding picture block, where the prediction process includes: performing sub-pixel interpolation based on the target interpolation filter indicated by the indication information, to obtain a prediction block of the current decoding picture block.

The decoder reconstructs a reconstruction block of the current decoding picture block based on the prediction block of the current decoding picture block.

According to a sixth aspect, an embodiment of this application further provides a video picture decoding method. The method includes the following:

A decoder parses a bitstream to obtain information of a current decoding picture block, where the information is used to indicate an inter prediction mode of the current decoding picture block.

The decoder obtains motion information of the current decoding picture block, where the motion information points to a fractional pixel position.

If the inter prediction mode of the current decoding picture block is not a target inter prediction mode, the decoder performs a prediction process on the current decoding picture block based on the motion information of the current decoding picture block, where the prediction process includes: performing sub-pixel interpolation based on a target interpolation filter indicated by indication information of the target interpolation filter, to obtain a prediction block of the current decoding picture block, where the indication information of the target interpolation filter is obtained by parsing the bitstream.

The decoder reconstructs the current decoding picture block based on the prediction block of the current decoding picture block.

Optionally, if the inter prediction mode of the current decoding picture block is a target inter prediction mode, the decoder performs a prediction process on the current decoding picture block based on the motion information of the current decoding picture block, where the prediction process includes: determining a target interpolation filter used for the current decoding picture block, and performing sub-pixel interpolation by using the target interpolation filter, to obtain a prediction block of the current decoding picture block.

It should be understood that, if the inter prediction mode of the current decoding picture block is the target inter prediction mode, that the decoder determines a target interpolation filter used for the current decoding picture block specifically includes: The decoder determines that an interpolation filter used for the previously decoded picture block in a decoding process is the target interpolation filter used for the current decoding picture block, or the decoder determines that the target interpolation filter used for the current decoding picture block is the target interpolation filter indicated by the indication information that is of the target interpolation filter and that is obtained by parsing the bitstream.

It can be learned that in this embodiment of this application, during inter prediction, the decoder selects the interpolation filter indicated by the indication information of the target inter prediction mode to perform sub-pixel interpolation, to obtain the prediction block of the current decoding picture block, so that the decoder selects the interpolation filter based on content of the current encoding picture block to perform an interpolation operation. This can obtain a prediction block with higher prediction accuracy, reduce a quantity of bitstreams, and increase a compression rate of a video picture.

With reference to the fifth aspect or the sixth aspect, in a possible implementation of this embodiment of this application, implementations in which the decoder obtains the motion information of the current decoding picture block may include but not limited to the following three implementations.

First implementation: In not the target inter prediction mode (for example, a non-merge mode), the decoder may parse the bitstream to obtain an index of the motion information of the current decoding picture block, and determine the motion information of the current decoding picture block based on the index of the motion information of the current decoding picture block and a candidate motion information list of the current decoding picture block.

Second implementation: In not the target inter prediction mode (for example, a non-merge mode), the decoder may parse the bitstream to obtain an index of the motion information of the current decoding picture block and a motion vector difference; determine a motion vector predictor of the current decoding picture block based on the index of the motion information of the current decoding picture block and a candidate motion information list of the current decoding picture block; and obtain a motion vector of the current decoding picture block based on the motion vector predictor and the motion vector difference.

Third implementation: In the target inter prediction mode (for example, a merge mode), if the inter prediction mode of the current decoding picture block is the merge mode (merge mode), the decoder obtains motion information that is of a previously decoded picture block and that is obtained through merging in the merge mode, that is, the motion information of the current decoding picture block.

With reference to the fifth aspect or the sixth aspect, in a possible implementation of this embodiment of this application, if the target interpolation filter is the second interpolation filter obtained by using the interpolation filter training method according to the first aspect or the second aspect, a filter parameter of the target interpolation filter is a preset filter parameter, or a filter parameter of the target interpolation filter is the filter parameter obtained by using the interpolation filter training method according to the first aspect or the second aspect.

Optionally, if the target interpolation filter is the second interpolation filter obtained by using the interpolation filter training method according to the first aspect or the second aspect, the method may further include:

parsing the bitstream to obtain a filter parameter of a target interpolation filter used for a current decoding picture unit; and before sub-pixel interpolation is performed based on the target interpolation filter to obtain the prediction block of the current decoding picture block, the method may further include: configuring the target interpolation filter by using the filter parameter of the target interpolation filter of the current decoding picture unit.

Optionally, if the target interpolation filter is the second interpolation filter obtained by using the interpolation filter training method according to the first aspect or the second aspect, the method may further include:

parsing the bitstream to obtain a filter parameter difference, where the filter parameter difference is a difference between a filter parameter of a target interpolation filter used for a current decoding picture unit and a filter parameter of a target interpolation filter used for a previously decoded picture unit;

obtaining the filter parameter of the target interpolation filter of the current decoding picture unit based on the filter parameter of the target interpolation filter of the previously decoded picture unit and the filter parameter difference; and configuring the target interpolation filter by using the filter parameter of the target interpolation filter of the current decoding picture unit.

Optionally, a picture unit includes a picture frame, a slice (slice), a video sequence subgroup, a coding tree unit (CTU), a coding unit (CU), or a prediction unit (PU).

According to a seventh aspect, an embodiment of this application further provides an interpolation filter training apparatus, including several functional units configured to implement any method according to the first aspect. For example, the interpolation filter training apparatus may include:

a label data obtaining module, configured to perform interpolation on a pixel, of a sample picture, at an integer pixel position by using a first interpolation filter, to obtain a first sub-pixel picture of the sample picture at a first fractional pixel position;

an interpolation module, configured to input the sample picture into a second interpolation filter, to obtain a second sub-pixel picture; and a parameter determining module, configured to determine a filter parameter of the second interpolation filter by minimizing a first function that is used to represent a difference between the first sub-pixel picture and the second sub-pixel picture.

According to an eighth aspect, an embodiment of this application further provides an interpolation filter training apparatus, including several functional units configured to implement any method according to the second aspect. For example, the interpolation filter training apparatus may include:

a label data obtaining module, configured to perform interpolation on a pixel, of a sample picture, at an integer pixel position by using a first interpolation filter, to obtain a first sub-pixel picture of the sample picture at a first fractional pixel position;

an interpolation module, configured to input the sample picture into a second interpolation filter, to obtain a second sub-pixel picture:

an inverse interpolation module, configured to input, to a third interpolation filter, the second sub-pixel picture on which a flipping operation is performed, to obtain a first picture, and perform an inverse operation of the flipping operation on the first picture to obtain a second picture, where the second interpolation filter and the third interpolation filter share a filter parameter; and a parameter determining module, configured to determine the filter parameter based on a first function that is used to represent a difference between the first sub-pixel picture and the second sub-pixel picture and a second function that is used to represent a difference between the sample picture and the second picture.

According to a ninth aspect, an embodiment of this application further provides an encoder, including several functional units configured to implement any method according to the third aspect. For example, the encoder may include:

an inter prediction unit, configured to perform inter prediction on a current encoding picture block to obtain motion information of the current encoding picture block, where the motion information of the current encoding picture block points to a fractional pixel position, and the inter prediction unit includes a filter selection unit, where the filter selection unit is configured to determine, from a set of candidate interpolation filters, a target interpolation filter used for the current encoding picture block; and an entropy encoding unit, configured to: encode the current encoding picture block based on an inter prediction mode of the current encoding picture block and the motion information of the current encoding picture block to obtain encoding information, and encode the encoding information into a bitstream, where the encoding information includes indication information of the target interpolation filter, and the indication information of the target interpolation filter is used to indicate to perform sub-pixel interpolation by using the target interpolation filter to obtain a reference block of a fractional pixel position corresponding to the current encoding picture block.

According to a tenth aspect, an embodiment of this application further provides an encoder, including several functional units configured to implement any method according to the fourth aspect. For example, the encoder may include:

an inter prediction unit, configured to perform inter prediction on a current encoding picture block to obtain motion information of the current encoding picture block, where the motion information of the current encoding picture block points to a fractional pixel position, and the inter prediction unit includes a filter selection unit, where the filter selection unit is configured to determine, from a set of candidate interpolation filters, a target interpolation filter used for the current encoding picture block; and an entropy encoding unit, configured to: encode the current encoding picture block based on an inter prediction mode of the current encoding picture block and the motion information of the current encoding picture block to obtain encoding information, and encode the encoding information into a bitstream, where if the inter prediction mode of the current encoding picture block is a target inter prediction mode, the encoding information does not include indication information of the target interpolation filter; or if the inter prediction mode of the current encoding picture block is not a target inter prediction mode, the encoding information includes indication information of the target interpolation filter, where the indication information of the target interpolation filter is used to indicate that the current encoding picture block uses the target interpolation filter to perform sub-pixel interpolation.

According to an eleventh aspect, an embodiment of this application further provides a decoder, including several functional units configured to implement any method according to the fifth aspect. For example, the encoder may include:

an entropy decoding unit, configured to: parse a bitstream to obtain indication information of a target interpolation filter; and obtain motion information of a current decoding picture block, where the motion information points to a fractional pixel position;

an inter prediction unit, configured to perform a prediction process on the current decoding picture block based on the motion information of the current decoding picture block, where the prediction process includes: performing sub-pixel interpolation based on the target interpolation filter indicated by the indication information, to obtain a prediction block of the current decoding picture block; and a reconstruction unit, configured to reconstruct a reconstruction block of the current decoding picture block based on the prediction block of the current decoding picture block.

According to a twelfth aspect, an embodiment of this application further provides a decoder, including several functional units configured to implement any method according to the sixth aspect. For example, the encoder may include:

an entropy decoding unit, configured to parse a bitstream to obtain information of a current decoding picture block, where the information is used to indicate an inter prediction mode of the current decoding picture block;

an inter prediction unit, configured to: obtain motion information of the current decoding picture block, where the motion information points to a fractional pixel position; and if the inter prediction mode of the current decoding picture block is not a target inter prediction mode, perform a prediction process on the current decoding picture block based on motion information of the current decoding picture block, where the prediction process includes: performing sub-pixel interpolation based on a target interpolation filter indicated by indication information of the target interpolation filter, to obtain a prediction block of the current decoding picture block, where the indication information of the target interpolation filter is obtained by parsing the bitstream; and a reconstruction unit, configured to reconstruct the current decoding picture block based on the prediction block of the current decoding picture block.

According to a thirteenth aspect, an embodiment of this application further provides an interpolation filter training apparatus, including a memory and a processor. The memory is configured to store program code, and the processor is configured to invoke the program code to perform a part of or all steps of any interpolation filter training method according to the first aspect or the second aspect.

For example, the processor is configured to invoke the program code to perform the following steps: performing interpolation on a pixel, of a sample picture, at an integer pixel position by using a first interpolation filter, to obtain a first sub-pixel picture of the sample picture at a first fractional pixel position; inputting the sample picture into a second interpolation filter, to obtain a second sub-pixel picture; and determining a filter parameter of the second interpolation filter by minimizing a first function that is used to represent a difference between the first sub-pixel picture and the second sub-pixel picture.

For example, the processor is configured to invoke the program code to perform the following steps: performing interpolation on a pixel, of a sample picture, at an integer pixel position by using a first interpolation filter, to obtain a first sub-pixel picture of the sample picture at a first fractional pixel position; inputting the sample picture into a second interpolation filter, to obtain a second sub-pixel picture: inputting, to a third interpolation filter, the second sub-pixel picture on which a flipping operation is performed, to obtain a first picture, and performing an inverse operation of the flipping operation on the first picture to obtain a second picture, where the second interpolation filter and the third interpolation filter share a filter parameter; and determining the filter parameter based on a first function that is used to represent a difference between the first sub-pixel picture and the second sub-pixel picture and a second function that is used to represent a difference between the sample picture and the second picture.

Optionally, implementations in which the processor determines the filter parameter based on a first loss function that is used to represent the difference between the first sub-pixel picture and the second sub-pixel picture and the second function that is used to represent the difference between the sample picture and the second picture may include but not limited to the following two implementations.

First implementation: The filter parameter is determined by minimizing a third function, where the third function is a weighted sum between the first function that is used to represent the difference between the first sub-pixel picture and the second sub-pixel picture and the second function that is used to represent the difference between the sample picture and the second picture.

Second implementation: The filter parameter is determined by alternately minimizing a first loss function that is used to represent the difference between the first sub-pixel picture and the second sub-pixel picture and the second function that is used to represent the difference between the sample picture and the second picture.

It should be understood that the interpolation filter training apparatus in the first aspect and the second aspect may be an encoding device or a compression device, and the foregoing device may be a device having a data processing function, such as a computer, a server, or a terminal (for example, a mobile phone or a tablet computer).

According to a fourteenth aspect, an embodiment of this application further provides an encoding apparatus, including a memory and a processor. The memory is configured to store program code, and the processor is configured to invoke the program code to perform a part of or all steps of any video picture encoding method according to the third aspect or the fourth aspect.

For example, the processor is configured to invoke the program code to perform the following steps: performing inter prediction on a current encoding picture block to obtain motion information of the current encoding picture block, where the motion information of the current encoding picture block points to a fractional pixel position, and the inter prediction process includes: determining, from a set of candidate interpolation filters, a target interpolation filter used for the current encoding picture block; and encoding the current encoding picture block based on an inter prediction mode of the current encoding picture block and the motion information of the current encoding picture block to obtain encoding information, and encoding the encoding information into a bitstream, where the encoding information includes indication information of the target interpolation filter, and the indication information of the target interpolation filter is used to indicate to perform sub-pixel interpolation by using the target interpolation filter to obtain a reference block of a fractional pixel position corresponding to the current encoding picture block.

For another example, the processor is configured to perform the following steps: performing inter prediction on a current encoding picture block to obtain motion information of the current encoding picture block, where the motion information of the current encoding picture block points to a fractional pixel position, and the inter prediction process includes: determining, from a set of candidate interpolation filters, a target interpolation filter used for the current encoding picture block; and encoding the current encoding picture block based on an inter prediction mode of the current encoding picture block and the motion information of the current encoding picture block to obtain encoding information, and encoding the encoding information into a bitstream, where if the inter prediction mode of the current encoding picture block is a target inter prediction mode, the encoding information does not include indication information of the target interpolation filter: or if the inter prediction mode of the current encoding picture block is not a target inter prediction mode, the encoding information includes indication information of the target interpolation filter, where the indication information of the target interpolation filter is used to indicate that the current encoding picture block uses the target interpolation filter to perform sub-pixel interpolation.

It should be understood that the encoder in the fourteenth aspect may be an encoding device including the encoder, and the encoding device may be a device having a data processing function, such as a computer, a server, or a terminal (for example, a mobile phone or a tablet computer).

With reference to the fourteenth aspect, in a possible implementation of this embodiment of this application, an implementation in which the processor determines, from the set of candidate interpolation filters, the target interpolation filter used for the current encoding picture block may be as follows: The encoder determines, from the set of candidate interpolation filters according to a rate-distortion cost criterion, the target interpolation filter used for the current encoding picture block.

With reference to the fourteenth aspect, in a possible implementation of this embodiment of this application, an implementation in which the processor performs inter prediction on the current encoding picture block to obtain the motion information of the current encoding picture block may be as follows:
  determining an integer pixel reference picture block that optimally matches the current encoding picture block;
  performing sub-pixel interpolation on the integer pixel reference picture block by using each interpolation filter in the set of candidate interpolation filters, to obtain N sub-pixel reference picture blocks, where N is a positive integer:
  determining, from the integer pixel reference picture block and the N sub-pixel reference picture blocks, a prediction block that optimally matches the current encoding picture block; and
  determining the motion information based on the prediction block, where an interpolation filter that is used to obtain the prediction block through interpolation is the target interpolation filter.

With reference to the fourteenth aspect, in a possible implementation of this embodiment of this application, the set of candidate interpolation filters includes the second interpolation filter obtained by using any interpolation filter training method according to the first aspect or the second aspect.

Optionally, if the target interpolation filter is the second interpolation filter obtained by using the interpolation filter training method according to the first aspect or the second aspect, a filter parameter of the target interpolation filter is a preset filter parameter, or a filter parameter of the target interpolation filter is the filter parameter obtained by using the interpolation filter training method according to the first aspect or the second aspect.

Further, the encoding information further includes the filter parameter of the target interpolation filter obtained through training: or the encoding information further includes a filter parameter difference, and the filter parameter difference is a difference between a filter parameter of a target interpolation filter that is used for a current picture unit and that is obtained through training and a filter parameter of a target interpolation filter that is used for a previously encoded picture unit and that is obtained through training.

It can be learned that the processor may perform online training on the second interpolation filter in the set of candidate interpolation filters, so that the interpolation filter can be adjusted in real time based on content of the current encoding picture unit, thereby improving prediction accuracy.

Optionally, a picture unit includes a picture frame, a slice (slice), a video sequence subgroup, a coding tree unit (CTU), a coding unit (CU), or a prediction unit (PU).

According to a fifteenth aspect, an embodiment of this application further provides a decoding apparatus, including a memory and a processor. The memory is configured to store program code, and the processor is configured to invoke the program code to perform a part of or all steps of any video picture decoding method according to the fifth aspect or the sixth aspect.

For example, the processor is configured to invoke the program code to perform the following steps:
  parsing a bitstream to obtain indication information of a target interpolation filter; obtaining motion information of a current decoding picture block, where the motion information points to a fractional pixel position;
  performing a prediction process on the current decoding picture block based on the motion information of the current decoding picture block, where the prediction process includes: performing sub-pixel interpolation based on the target interpolation filter indicated by the indication information, to obtain a prediction block of the current decoding picture block; and
  reconstructing a reconstruction block of the current decoding picture block based on the prediction block of the current decoding picture block.

For another example, the processor is configured to invoke the program code to perform the following steps:
  parsing a bitstream to obtain information of a current decoding picture block, where the information is used to indicate an inter prediction mode of the current decoding picture block;
  obtaining motion information of the current decoding picture block, where the motion information points to a fractional pixel position;
  if the inter prediction mode of the current decoding picture block is not a target inter prediction mode, performing a prediction process on the current decoding picture block based on the motion information of the current decoding picture block, where the prediction process includes: performing sub-pixel interpolation based on a target interpolation filter indicated by indication information of the target interpolation filter, to obtain a prediction block of the current decoding picture block, where the indication information of the target interpolation filter is obtained by parsing the bitstream; and
  reconstructing the current decoding picture block based on the prediction block of the current decoding picture block.

Optionally, if the inter prediction mode of the current decoding picture block is a target inter prediction mode, the decoder performs a prediction process on the current decoding picture block based on the motion information of the current decoding picture block, where the prediction process includes: determining a target interpolation filter used for the current decoding picture block, and performing sub-pixel interpolation by using the target interpolation filter, to obtain a prediction block of the current decoding picture block.

It should be understood that, if the inter prediction mode of the current decoding picture block is the target inter prediction mode, that the processor determines a target interpolation filter used for the current decoding picture block specifically includes: The processor determines that an interpolation filter used for the previously decoded picture block in a decoding process is the target interpolation filter used for the current decoding picture block, or the processor determines that the target interpolation filter used for the current decoding picture block is the target interpolation filter indicated by the indication information that is of the target interpolation filter and that is obtained by parsing the bitstream.

With reference to the fifteenth aspect, in a possible implementation of this embodiment of this application, implementations in which the processor obtains the motion information of the current decoding picture block may include but not limited to the following three implementations.

First implementation: In not the target inter prediction mode (for example, a non-merge mode), the decoder may parse the bitstream to obtain an index of the motion information of the current decoding picture block, and determine the motion information of the current decoding picture block based on the index of the motion information of the current decoding picture block and a candidate motion information list of the current decoding picture block.

Second implementation: In not the target inter prediction mode (for example, a non-merge mode), the processor may parse the bitstream to obtain an index of the motion information of the current decoding picture block and a motion vector difference: determine a motion vector predictor of the current decoding picture block based on the index of the motion information of the current decoding picture block and a candidate motion information list of the current decoding picture block; and obtain a motion vector of the current decoding picture block based on the motion vector predictor and the motion vector difference.

Third implementation: In the target inter prediction mode (for example, a merge mode), if the inter prediction mode of the current decoding picture block is the merge mode (merge mode), the processor obtains motion information that is of a previously decoded picture block and that is obtained through merging in the merge mode, that is, the motion information of the current decoding picture block.

With reference to the fifteenth aspect, in a possible implementation of this embodiment of this application, if the target interpolation filter is the second interpolation filter obtained by using the interpolation filter training method according to the first aspect or the second aspect,
  a filter parameter of the target interpolation filter is a preset filter parameter, or a filter parameter of the target interpolation filter is the filter parameter obtained by using the interpolation filter training method according to the first aspect or the second aspect.

Optionally, if the target interpolation filter is the second interpolation filter obtained by using the interpolation filter training method according to the first aspect or the second aspect, the processor may further perform the following steps:
  parsing the bitstream to obtain a filter parameter of a target interpolation filter used for a current decoding picture unit; and
  before sub-pixel interpolation is performed based on the target interpolation filter to obtain the prediction block of the current decoding picture block, configuring the target interpolation filter by using the filter parameter of the target interpolation filter of the current decoding picture unit.

Optionally, if the target interpolation filter is the second interpolation filter obtained by using the interpolation filter training method according to the first aspect or the second aspect, the processor may further perform the following steps:
  parsing the bitstream to obtain a filter parameter difference, where the filter parameter difference is a difference between a filter parameter of a target interpolation filter used for a current decoding picture unit and a filter parameter of a target interpolation filter used for a previously decoded picture unit:
  obtaining the filter parameter of the target interpolation filter of the current decoding picture unit based on the filter parameter of the target interpolation filter of the previously decoded picture unit and the filter parameter difference; and configuring the target interpolation filter by using the filter parameter of the target interpolation filter of the current decoding picture unit.

Optionally, a picture unit includes a picture frame, a slice (slice), a video sequence subgroup, a coding tree unit (CTU), a coding unit (CU), or a prediction unit (PU).

According to a sixteenth aspect, an embodiment of this application further provides a computer-readable storage medium, including program code. When the program code is run on a computer, the computer is enabled to perform a part of or all steps of any interpolation filter training method according to the first aspect or the second aspect.

According to a seventeenth aspect, an embodiment of this application provides a computer program product. When the computer program product runs on a computer, the computer is enabled to perform a part of or all steps of any interpolation filter training method according to the first aspect or the second aspect.

According to an eighteenth aspect, an embodiment of this application further provides a computer-readable storage medium, including program code. When the program code is run on a computer, the computer is enabled to perform a part of or all steps of any video picture encoding method according to the third aspect or the fourth aspect.

According to a nineteenth aspect, an embodiment of this application provides a computer program product. When the computer program product runs on a computer, the computer is enabled to perform a part of or all steps of any video picture encoding method according to the third aspect or the fourth aspect.

According to a twentieth aspect, an embodiment of this application further provides a computer-readable storage medium, including program code. When the program code is run on a computer, the computer is enabled to perform a part of or all steps of any video picture decoding method according to the fifth aspect or the sixth aspect.

According to a twenty-first aspect, an embodiment of this application provides a computer program product. When the computer program product runs on a computer, the computer is enabled to perform a part of or all steps of any video picture decoding method according to the fifth aspect or the sixth aspect.

BRIEF DESCRIPTION OF DRAWINGS

To describe technical solutions in embodiments of this application or in the background clearer, the following briefly describes the accompanying drawings for describing the embodiments of this application or the background.

FIG. 4 is an illustrative schematic diagram of positions of integer pixels and sub-pixels according to an embodiment of this application:

FIG. 5(*a*) and FIG. 5(*b*) are illustrative schematic diagrams of an invertibility principle of sub-pixel interpolation according to an embodiment of this application:

FIG. 6A is a schematic flowchart of an interpolation filter training method according to an embodiment of this application:

FIG. 6B is an illustrative schematic diagram of an interpolation filter training procedure according to an embodiment of this application:

FIG. 6C is a schematic flowchart of another interpolation filter training method according to an embodiment of this application:

DESCRIPTION OF EMBODIMENTS

Figure 1:
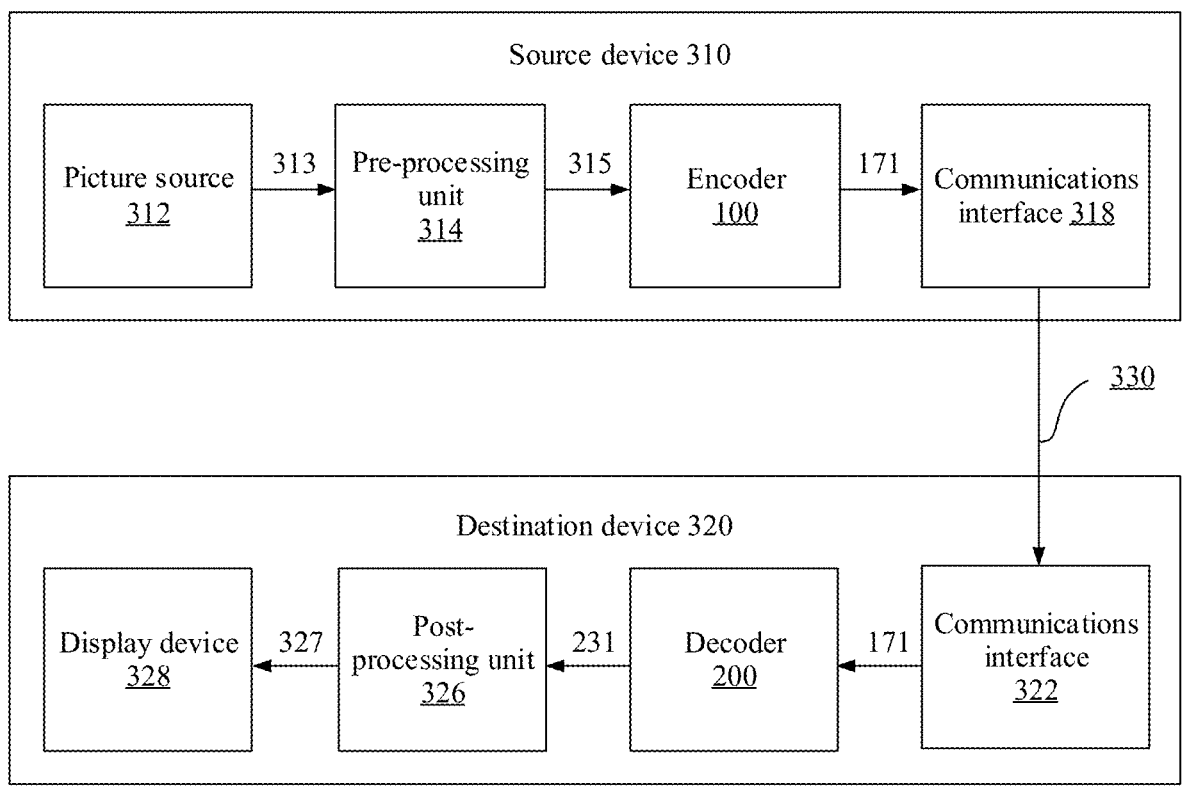
FIG. 1 is a schematic block diagram of a video coding system according to an embodiment of this application.

In the following description, reference is made to the accompanying drawings that form a part of this disclosure and show; by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed description shall not be understood in a limiting sense, and the scope of the present disclosure is defined by the appended claims.

For example, it should be understood that disclosed content with reference to described methods may also hold true for a corresponding device or system configured to perform the method, and vice versa. For example, if one or more specific method steps are described, a corresponding device may include one or more units such as functional units for performing the described one or more method steps (for example, one unit performs the one or more steps: or a plurality of units, each of which performs one or more of the plurality of steps), even if such one or more units are not explicitly described or illustrated in the accompanying drawings. In addition, for example, if a specific apparatus is described based on one or more units such as a functional unit, a corresponding method may include a step used to perform one or more functionalities of one or more units (for example, one step used to perform one or more functionalities of one or more units: or a plurality of steps, each of which is used perform one or more functionalities of one or more units in a plurality of units), even if such one or more of steps are not explicitly described or illustrated in the accompanying drawings. Further, it should be understood that features of the various example embodiments and/or aspects described in this specification may be combined with each other, unless otherwise specified.

Video coding typically refers to processing of a sequence of pictures, where the sequence of pictures forms a video or a video sequence. In the field of video coding, the terms "picture", "frame", and "image" may be used as synonyms. Video coding used in this application (or this disclosure) indicates either video encoding or video decoding. Video encoding is performed on a source side, and usually includes processing (for example, by compressing) a raw video picture to reduce an amount of data for representing the video picture (for more efficient storage and/or transmission). Video decoding is performed on a destination side, and typically includes inverse processing in comparison with the encoder to reconstruct a video picture. "Coding" of a video picture (or referred to as a picture, which is explained below) in the embodiments should be understood as "encoding" or "decoding" of a video sequence. A combination of encoding components and decoding components is also referred to as codec (CODEC).

In a case of lossless video coding, raw video pictures can be reconstructed, and this means that reconstructed video pictures have same quality as the raw video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed on a decoder side. This means that quality of reconstructed video pictures is lower or poorer than that of the raw video pictures.

Several H.261 video coding standards are used for "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, on an encoder side, a video is usually processed, that is, encoded, at a block (video block) level. For example, a prediction block is generated through spatial (intra-picture) prediction and temporal (inter-picture) prediction, the prediction block is subtracted from a current block (a block that is currently being processed or to be processed) to obtain a residual block, and the residual block is transformed in the transform domain and quantized to reduce an amount of data that is to be transmitted (compressed). On the decoder side, an inverse processing part relative to the encoder is applied to the encoded or compressed block to reconstruct the current block for representation. Furthermore, the encoder duplicates a processing loop of the decoder, so that the encoder and the decoder generate identical prediction (for example, intra prediction and inter prediction) and/or reconstruction for processing, that is, coding, subsequent blocks.

As used in this specification, the terms "block", "picture block", and "image block" may be used as synonyms, and may be a part of a picture or a frame. For ease of description, the embodiments of the present disclosure are described herein with reference to reference software of ITU-T H.266/ versatile video coding (VVC) or high-efficiency video coding (HEVC) developed by the joint collaboration team on video coding (JCT-VC) of ITU-T video coding experts group (VCEG) and ISO/IEC motion picture experts group (MPEG). A person of ordinary skill in the art will understand that the embodiments of the present disclosure are not limited to HEVC or VVC. In HEVC, a CTU is split into a plurality of CUs by using a quadtree structure represented as a coding tree. A decision on whether to code a picture area by using inter-picture (temporal) or intra-picture (spatial) prediction is made at a CU level. Each CU may further be split into one, two, or four PUs based on a PU splitting pattern. In one PU, a same prediction process is applied, and related information is transmitted to the decoder on a PU basis. After obtaining a residual block by applying the prediction process based on the PU splitting pattern, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular. For example, coding tree units (CTU) are first partitioned by using a quadtree structure. A leaf node of a quadtree is further partitioned by using a binary tree structure. A leaf node of a binary tree is referred to as a coding unit (CU), and the segmentation is used for prediction and transform processing without any further partition. This means that the CU, PU and TU have a same block size in the QTBT coding block structure. In addition, multiply partition, such as triple tree partition, is proposed to be used in combination with the QTBT block structure.

As used in this specification, the term "encoding picture block" is a picture block used on the encoder side, and similarly, the term "decoding picture block" is a picture block used on the decoder side. A "current encoding picture block" may be represented as a "current to-be-encoded picture block", a "current encoding block", or the like. A "current decoding picture block" may be represented as a "current to-be-decoded picture block", a "current decoding block", or the like. A "reference block" may be represented as a "reference picture block". A "prediction block" may be represented as a "prediction picture block", or may be represented as an "optimal matched block", a "matched block", or the like in some scenarios.

As used in this specification, a "first interpolation filter" is an interpolation filter provided in conventional technologies, and may be an interpolation filter with a fixed coefficient, for example, a bilinear interpolation filter or a bicubic interpolation filter. The "first interpolation filter" may alternatively be a content-adaptive interpolation filter or another type of interpolation filter. In H.264/AVC, a 6-tap finite response filter is used to generate a half-pixel sample value, and a simple bilinear interpolation is used to generate a quarter pixel sample value. In comparison with interpolation filters in H.264/AVC, much improvement has been made to interpolation filters in HEVC. An 8-tap filter is used to generate a half pixel sample value, and a 7-tap interpolation filter is used to generate a quarter pixel sample value. To cope with non-stationarity of natural videos, content-adaptive interpolation filters are proposed in researches. A typical adaptive interpolation filter is used to estimate a filter coefficient on the encoder side based on an error of motion compensation prediction, and then the filter coefficient is encoded and written into a bitstream. To decrease complexity of the interpolation filter, a separable adaptive interpolation filter is proposed, which can significantly decrease complexity while basically ensuring coding performance.

As used in this specification, a "second interpolation filter" and a "third interpolation filter" are interpolation filters obtained based on interpolation filter training methods provided in the embodiments of this application. For details, refer to related descriptions in the embodiments of the interpolation filter training methods. It can be understood that the second interpolation filter and/or the third interpolation filter may be a support vector machine (SVM), a neural network (NN), a convolutional neural network (CNN), or another form. This is not limited in the embodiments of this application.

As used in this specification, a "target interpolation filter" is an interpolation filter selected from a set of candidate interpolation filters. In this specification, the "set of candidate interpolation filters" may include one or more interpolation filters. The plurality of interpolation filters are of different types of filters, and may include but not limited to the second interpolation filter in this specification. In another implementation of this application, the plurality of interpolation filters in the set of candidate filters may not include the second interpolation filter.

Motion information may include a motion vector. The motion vector is an important parameter in an inter prediction process, and represents a spatial displacement of a previously encoded picture block relative to a current encoding picture block. A motion estimation method, such as motion search, may be used to obtain the motion vector. In early inter prediction technologies, a bit representing a motion vector is included in an encoded bitstream, to allow a decoder to reproduce a prediction block, thereby obtaining a reconstruction block. To further improve coding efficiency, it is further proposed to differentially code a motion vector by using a reference motion vector, that is, to code only a difference between the motion vector and the reference motion vector, instead of coding the entire motion vector. In some cases, a reference motion vector may be selected from motion vectors previously used in a video stream. Selecting a previously used motion vector to code a current motion vector can further reduce a quantity of bits included in the coded video bitstream.

Figure 2:
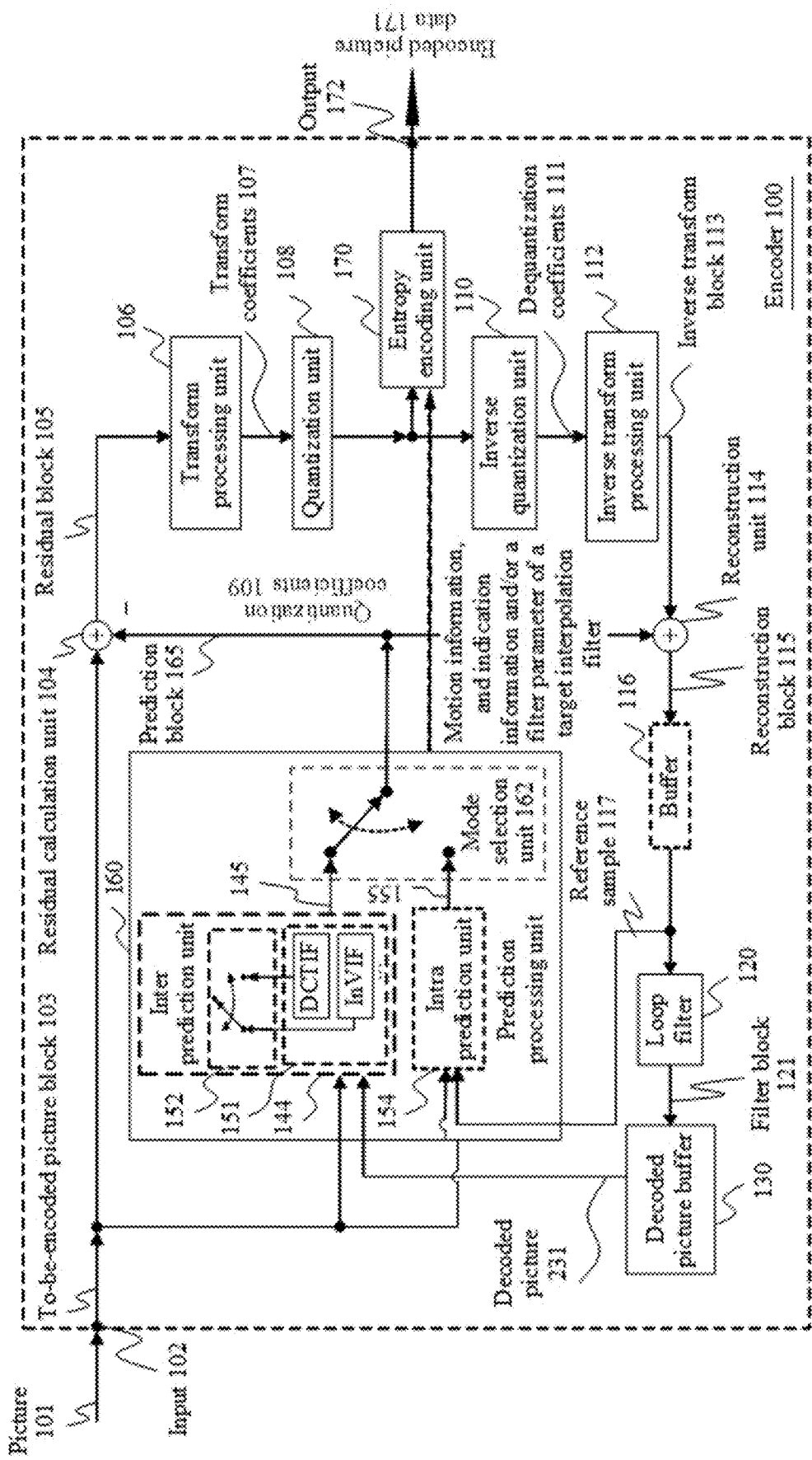
FIG. 2 is a schematic block diagram of an encoder according to an embodiment of this application.
Figure 3:
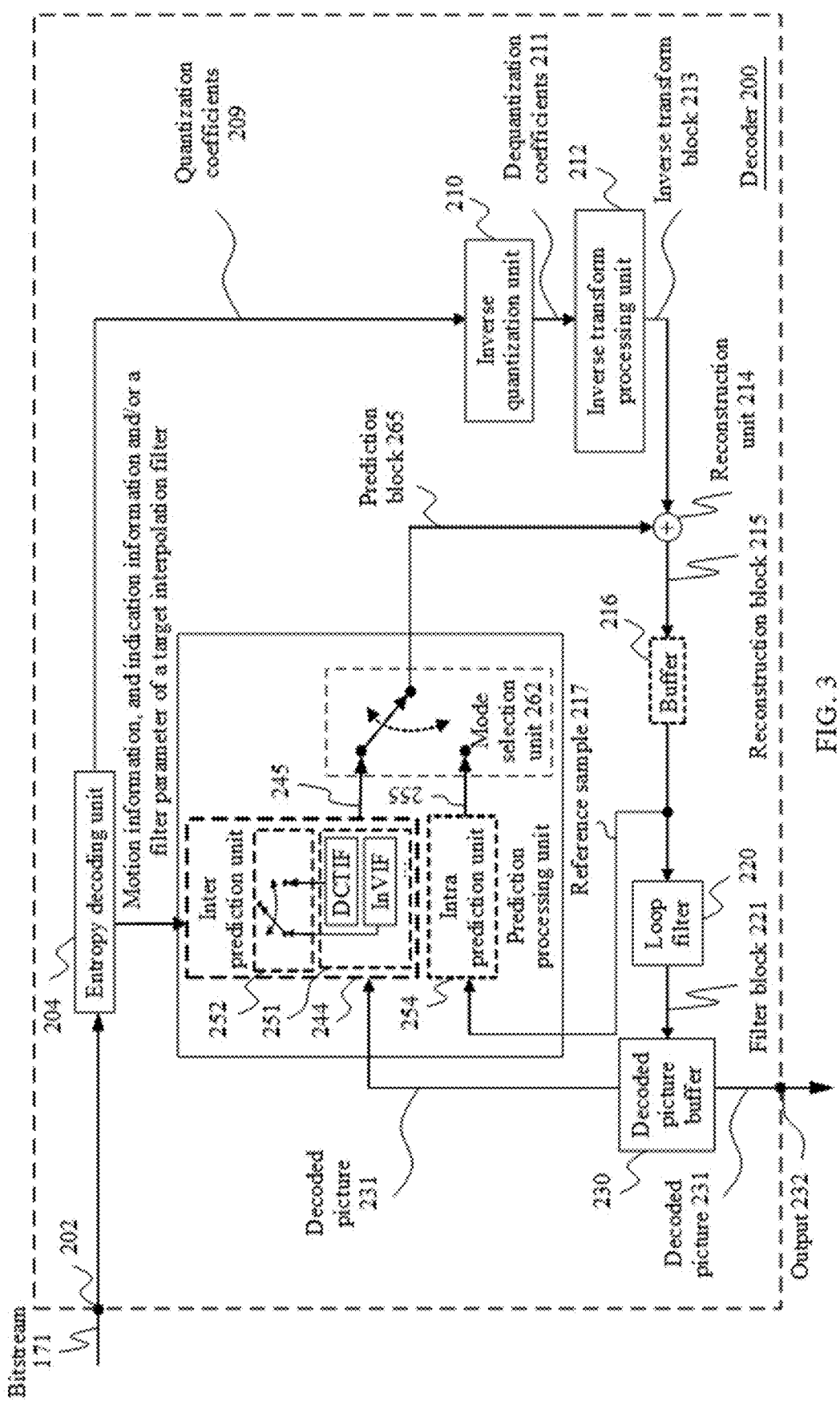
FIG. 3 is a schematic block diagram of a decoder according to an embodiment of this application.

The following describes embodiments of an encoder 100, a decoder 200, and a coding system 300 based on FIG. 1 to FIG. 3.

FIG. 1 is a conceptual or schematic block diagram of an example coding system 300, for example, a video coding system 300 that may use a technology of this application (this disclosure). An encoder 100 (for example, a video encoder 100) and a decoder 200 (for example, a video decoder 200) of the video coding system 300 are device examples that may be used to perform video picture encoding or decoding technologies according to various examples described in this application. As shown in FIG. 1, the coding system 300 includes a source device 310 configured to provide encoded data 330, for example, an encoded picture 330, for example, to a destination device 320 for decoding the encoded data 330.

The source device 310 includes an encoder 100, and may additionally, or optionally, include a picture source 312, a pre-processing unit 314, for example, a picture pre-processing unit 314, and a communications interface or communications unit 318.

The picture source 312 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; and/or any type of device for obtaining and/or providing a real-world picture or a computer animation picture (for example, screen content or a virtual reality (VR) picture); and/or any combination thereof (for example, an augmented reality (AR) picture).

A (digital) picture is or may be considered as a two-dimensional array or matrix of samples with intensity values. A sample in the array may be referred to as a pixel (a short form of picture element) or a pel (. A quantity of samples in horizontal and vertical directions (or axes) of the array or the picture defines a size and/or a resolution of the picture. For representation of a color, typically three color components are used. For example, the picture may be represented as or include three sample arrays. In an RGB format or a color space, a picture includes corresponding red, green and blue sample arrays. However, in video coding, each pixel is usually represented in a luminance/chrominance format or a color space, for example, YCbCr, which includes a luminance component indicated by Y (sometimes indicated by L instead) and two chrominance components indicated by Cb and Cr. The luminance (luma for short) component Y represents brightness or gray level intensity (for example, both are the same in a gray-scale picture), and the two chrominance (chroma for short) components Cb and Cr represent chrominance or color information components. Correspondingly, a picture in an YCbCr format includes a luminance sample array of luminance sample values (Y), and two chrominance sample arrays of chrominance values (Cb and Cr). A picture in an RGB format may be transformed or converted into a picture in a YCbCr format and vice versa. This process is also referred to as color conversion or transform. If a picture is monochrome, the picture may include only a luma sample array.

The picture source 312 (for example, the video source 312) may be, for example a camera for capturing a picture, a memory, for example, a picture memory, including or storing a previously captured or generated picture, and/or any kind of interface (internal or external) to obtain or receive a picture. The camera may be, for example, a local camera, or a camera integrated in the source device, and the memory may be a local memory or, for example, a memory integrated in the source device. The interface may be, for example, an external interface to receive a picture from an external video source. The external video source is, for example, an external picture capturing device such as a camera, an external memory, or an external picture generation device. The external picture generation device is, for example, an external computer graphics processor, a computer or a server. The interface may be any type of interface, for example, a wired or wireless interface or an optical interface, according to any proprietary or standardized interface protocol. The interface for obtaining the picture data 313 may be the communications interface 318 or a part of the communications interface 318.

To distinguish from the pre-processing unit 314 and processing performed by the pre-processing unit 314, the picture or picture data 313 (for example, video data 312) may also be referred to as a raw picture or raw picture data 313.

The pre-processing unit 314 is configured to receive the (raw) picture data 313 and perform pre-processing on the picture data 313, to obtain a pre-processed picture 315 or pre-processed picture data 315. For example, pre-processing performed by the pre-processing unit 314 may include trimming, color format conversion (for example, from RGB to YCbCr), color correction, or denoising. It can be understood that the pre-processing unit 314 may be an optional component.

The encoder 100 (for example, the video encoder 100) is configured to receive the preprocessed picture data 315 and provide encoded picture data 171 (details are further described below; for example, based on FIG. 2 or FIG. 8). In an example, the encoder 100 may be configured to perform a video picture encoding method. In another embodiment, the encoder 100 may be further configured to train an interpolation filter.

The communications interface 318 of the source device 310 may be configured to receive the encoded picture data 171 and transmit the encoded picture data 171 to another device, for example, the destination device 320 or any other device, for storage or direct reconstruction. Alternatively, the communications interface 318 is configured to process the encoded picture data 171 before correspondingly storing encoded data 330 and/or transmitting the encoded data 330 to another device. The another device is, for example, the destination device 320 or any other device used for decoding or storage.

The destination device 320 includes a decoder 200 (for example, the video decoder 200), and may additionally, or optionally, include a communications interface or communications unit 322, a post-processing unit 326, and a display device 328.

The communications interface 322 of the destination device 320 is configured to receive the encoded picture data 171 or the encoded data 330, for example, directly from the source device 310 or from any other source, for example, a storage device, for example, an encoded picture data storage device.

The communications interface 318 and the communications interface 322 may be configured to transmit or receive the encoded picture data 171 or the encoded data 330 over a direct communication link between the source device 310 and the destination device 320 or through any type of network. The direct communication link is, for example, a direct wired or wireless connection. The any type of network is, for example, a wired or wireless network or any combination thereof, or any type of private or public network, or any combination thereof.

The communications interface 318 may be, for example, configured to package the encoded picture data 171 into an appropriate format, for example, packets, for transmission over a communication link or a communications network.

The communications interface 322, forming the counterpart of the communications interface 318, may be, for example, configured to de-package the encoded data 330) to obtain the encoded picture data 171.

Both the communications interface 318 and the communications interface 322 may be configured as unidirectional communications interfaces, as indicated by an arrow that points from the source device 310 to the destination device 320 and that is used for the encoded picture data 330 in FIG. 1: or may be configured as bidirectional communications interfaces, and may be configured to, for example, send and receive messages to establish a connection, and acknowledge and exchange any other information related to a communication link and/or data transmission such as encoded picture data transmission.

The decoder 200 is configured to receive the encoded picture data 171 and provide decoded picture data 231 or decoded picture 231 (details are further described below; for example, based on FIG. 3, FIG. 9, FIG. 10, or FIG. 11A and FIG. 11B). In an example, the decoder 200 may be configured to perform a video picture decoding method described below:

The post-processor 326 of the destination device 320 is configured to post-process the decoded picture data 231 (also referred to as reconstructed picture data), for example, a decoded picture 231, to obtain post-processed picture data 327, for example, a post-processed picture 327. Post-processing performed by the post-processing unit 326 may include, for example, color format conversion (for example, from YCbCr to RGB), color correction, trimming, or re-sampling, or any other processing, for example, for preparing the decoded picture data 231 for display, for example, by the display device 328.

The display device 328 of the destination device 320 is configured to receive the post-processed picture data 327 for displaying the picture, for example, to a user or viewer. The display device 328 may be or include any type of display configured to present a reconstructed picture, for example, an integrated or external display or monitor. For example, the display may include a liquid crystal display (liquid crystal display, LCD), an organic light emitting diode (organic light emitting diode, OLED) display, a plasma display, a projector, a micro LED display, a liquid crystal on silicon (liquid crystal on silicon, LCoS), a digital light processor (digital light processor, DLP), or any type of other displays.

Although FIG. 1 depicts the source device 310 and the destination device 320 as separate devices, embodiments of devices may also include the source device 310 and the destination device 320 or functionalities of both the source device 310 and the destination device 320: the source device 310 or a corresponding functionality and the destination device 320 or a corresponding functionality. In such embodiments, the source device 310 or the corresponding functionality and the destination device 320 or the corresponding functionality may be implemented using the same hardware and/or software or by separate hardware and/or software or by any combination thereof.

As will be apparent for a person skilled in the art based on the descriptions, existence and (exact) split of functionalities of the different units or functionalities of the source device 310 and/or the destination device 320 shown in FIG. 1 may vary depending on an actual device and application.

The encoder 100 (for example, the video encoder 100) and the decoder 200 (for example, the video decoder 200) each may be implemented as any one of various suitable circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store software instructions in an appropriate and non-transitory computer-readable storage medium and may execute instructions by using hardware such as one or more processors, to perform the technologies of this disclosure. Any of the foregoing content (including hardware, software, a combination of hardware and software, and the like) may be considered as one or more processors. The video encoder 100 and the video decoder 200 each may be included in one or more encoders or decoders, and the encoder or the decoder may be integrated as a part of a combined encoder/decoder (codec) in a corresponding device.

The source device 310 may be referred to as a video encoding device or a video encoding apparatus. The destination device 320 may be referred to as a video decoding device or a video decoding apparatus. The source device 310 and the destination device 320 may be examples of a video encoding device and a video decoding device or a video encoding apparatus and a video decoding apparatus.

The source device 310 and the destination device 320 may include any one of a wide range of devices, including any type of handheld or stationary device, for example, a notebook or laptop computer, a mobile phone, a smartphone, a tablet or tablet computer, a video camera, a desktop computer, a set-top box, a television, a display device, a digital media player, a video game console, a video streaming device (such as a content service server or a content delivery server), a broadcast receiver device, or a broadcast transmitter device, and may use or not use any type of operating system.

In some cases, the source device 310 and the destination device 320 may be equipped for wireless communication. Therefore, the source device 310 and the destination device 320 may be wireless communications devices.

In some cases, the video coding system 300 shown in FIG. 1 is merely an example, and the technologies of this application are applicable to video coding settings (for example, video encoding or video decoding) that do not necessarily include any data communication between an encoding device and a decoding device. In other examples, data may be retrieved from a local memory, streamed over a network, or the like. A video encoding device may encode and store data to the memory, and/or a video decoding device may retrieve and decode data from the memory. In some examples, the encoding and the decoding are performed by devices that do not communicate with one another, but simply encode data to the memory and/or retrieve and decode data from the memory.

It should be understood that for each of the examples described with reference to the video encoder 100, the video decoder 200 may be configured to perform a reverse process. With regard to signaling syntax elements, the video decoder 200 may be configured to receive and parse the syntax elements and correspondingly decode related video data. In some examples, the video encoder 100 may entropy encode, into an encoded video bitstream (also referred to as a bitstream), one or more syntax elements that are used to define indication information of a target interpolation filter and parameter information of an interpolation filter. In such examples, the video decoder 200 can parse the syntax elements and decode associated video data accordingly Encoder & Encoding Method FIG. 2 is a schematic/conceptual block diagram of an example video encoder 100 configured to implement the technologies of this application (disclosure). In the example of FIG. 2, the video encoder 100 includes a residual calculation unit 104, a transform processing unit 106, a quantization unit 108, an inverse quantization unit 110, an inverse transform processing unit 112, a reconstruction unit 114, a buffer 116, a loop filter unit 120, a decoded picture buffer (decoded picture buffer, DPB) 130, a prediction processing unit 160, and an entropy encoding unit 170. The prediction processing unit 160 may include an inter prediction unit 144, an intra prediction unit 154, and a mode selection unit 162. The inter prediction unit 144 may include a motion estimation unit and a motion compensation unit (not shown in the diagram). The video encoder 100 shown in FIG. 2 may also be referred to as a hybrid video encoder or a video encoder based on a hybrid video codec.

For example, the residual calculation unit 104, the transform processing unit 106, the quantization unit 108, the prediction processing unit 160, and the entropy encoding unit 170 form a forward signal path of the encoder 100, whereas, for example, the inverse quantization unit 110, the inverse transform processing unit 112, the reconstruction unit 114, the buffer 116, the loop filter 120, the decoded picture buffer (decoded picture buffer, DPB) 130, and the prediction processing unit 160 form a reverse signal path of the encoder. The reverse signal path of the encoder corresponds to a signal path of a decoder (refer to the decoder 200 in FIG. 3).

The encoder 100 is configured to receive, for example, from an input 102, a picture 101 or a block 103 of the picture 101, for example, a picture of a sequence of pictures forming a video or video sequence. The picture block 103 may also be referred to as a current picture block or a to-be-encoded picture block, and the picture 101 may be referred to as a current picture or a to-be-encoded picture (in particular in video coding, to distinguish the current picture from other pictures, for example, previously encoded and/or decoded pictures of a same video sequence, such as a video sequence which also includes the current picture).

In an embodiment, the encoder 100 may include a partitioning unit (not depicted in FIG. 2), configured to partition the picture 101 into a plurality of blocks such as the picture block 103. The picture 101 is usually partitioned into a plurality of non-overlapping blocks. The partitioning unit may be configured to use a same block size for all pictures in the video sequence and a corresponding grid defining the block size, or change a block size between pictures or subsets or groups of pictures, and partition each picture into corresponding blocks.

In an example, the prediction processing unit 160 of the video encoder 100 may be configured to perform any combination of the partitioning techniques described above.

Like the picture 101, the block 103 is also or may be considered as a two-dimensional array or matrix of samples with luma values (sample values), although of a smaller size than the picture 101. In other words, the block 103 may include, for example, one sample array (for example, a luma array in a case of a monochrome picture 101), three sample arrays (for example, one luma array and two chroma arrays in a case of a color picture), or any other quantity and/or type of arrays depending on an applied color format. A quantity of samples in horizontal and vertical directions (or axes) of the block 103 defines a size of the block 103.

The encoder 100 shown in FIG. 2 is configured to encode the picture 101 by blocks, for example, the encoder 100 encodes and predicts each block 103.

The residual calculation unit 104 is configured to calculate a residual block 105 based on the picture block 103 and a prediction block 165 (further details about the prediction block 165 are provided later), for example, by subtracting sample values of the prediction block 165 from sample values of the picture block 103, sample by sample (pixel by pixel) to obtain the residual block 105 in a sample domain.

The transform processing unit 106 is configured to apply a transform, for example, a discrete cosine transform (DCT) or discrete sine transform (DST), on the sample values of the residual block 105 to obtain transform coefficients 107 in a transform domain. The transform coefficients 107 may also be referred to as transform residual coefficients and represent the residual block 105 in the transform domain.

The transform processing unit 106 may be configured to apply an integer approximation of DCT/DST, such as transforms specified in HEVC/H.265. In comparison with an orthogonal DCT transform, such an integer approximation is typically scaled by a factor. To preserve a norm of a residual block which is processed by using forward and inverse transforms, applying an additional scale factor is a part of a transform process. The scale factor is usually chosen based on some constraints. For example, the scale factor is a power of two for a shift operation, a bit depth of the transform coefficient, or a tradeoff between accuracy and implementation costs. Specific scaling factors are, for example, specified for the inverse transform, for example, by the inverse transform processing unit 112 on the encoder side 100 (and for the corresponding inverse transform, for example, by an inverse transform processing unit 212 on a decoder side 200) and corresponding scaling factors for the forward transform, for example, by the transform processing unit 106 on the encoder side 100 may be specified accordingly.

The quantization unit 108 is configured to quantize the transform coefficients 107 to obtain quantized transform coefficients 109, for example, by applying scalar quantization or vector quantization. The quantized transform coefficients 109 may also be referred to as quantized residual coefficients 109. The quantization process may reduce a bit depth associated with some or all of the transform coefficients 107. For example, an n-bit transform coefficient may be rounded down to an m-bit transform coefficient during quantization, where n is greater than m. A quantization degree may be modified by adjusting a quantization parameter (quantization parameter, QP). For example, for scalar quantization, different scales may be applied to achieve finer or coarser quantization. A smaller quantization step corresponds to finer quantization, and a larger quantization step corresponds to coarser quantization. An applicable quantization step may be indicated by the quantization parameter (quantization parameter, QP). The quantization parameter may be, for example, an index to a predefined set of applicable quantization steps. For example, a smaller quantization parameter may correspond to finer quantization (a smaller quantization step) and a larger quantization parameter may correspond to coarser quantization (a larger quantization step) or vice versa. The quantization may include division by a quantization step and corresponding quantization or inverse quantization, for example, performed by the inverse quantization unit 110, or may include multiplication by a quantization step. In embodiments according to some standards such as HEVC, a quantization parameter may be used to determine the quantization step. Generally, the quantization step may be calculated based on a quantization parameter using a fixed point approximation of an equation including division. An additional scaling factor may be introduced for quantization and dequantization to restore the norm of the residual block, where the norm of the residual block may be modified because of a scale used in the fixed point approximation of the equation for the quantization step and the quantization parameter. In an example implementation, scales of the inverse transform and the dequantization may be combined. Alternatively, a customized quantization table may be used and signaled from the encoder to the decoder, for example, in a bitstream. The quantization is a lossy operation, where loss increases with an increasing quantization step.

The inverse quantization unit 110 is configured to apply the inverse quantization of the quantization unit 108 on the quantized coefficients to obtain dequantization coefficients 111, for example, by applying the inverse of the quantization scheme applied by the quantization unit 108 based on or using the same quantization step as the quantization unit 108. The dequantization coefficients 111 may also be referred to as dequantized residual coefficients 111 and correspond, although typically not identical to the transform coefficients due to the loss by quantization, to the transform coefficients 107.

The inverse transform processing unit 112 is configured to apply the inverse transform of the transform applied by the transform processing unit 106, for example, an inverse discrete cosine transform (DCT) or an inverse discrete sine transform (DST), to obtain an inverse transform block 113 in the sample domain. The inverse transform block 113 may also be referred to as an inverse transform dequantized block 113 or an inverse transform residual block 113.

The reconstruction unit 114 (for example, a summer 114) is configured to add the inverse transform block 113 (that is, the reconstructed residual block 113) to the prediction block 165 to obtain a reconstruction block 115 in the sample domain, for example, by adding the sample values of the reconstructed residual block 113 and the sample values of the prediction block 165.

Optionally, a buffer unit 116 (a "buffer" 116 for short) of, for example, a line buffer 116, is configured to buffer or store the reconstruction block 115 and a corresponding sample value, for example, for intra prediction. In further embodiments, the encoder may be configured to use unfiltered reconstructed blocks and/or the respective sample values stored in the buffer unit 116 for any kind of estimation and/or prediction, for example, intra prediction.

For example, in an embodiment, the encoder 100 may be configured so that the buffer unit 116 is not only used for storing the reconstruction block 115 for the intra prediction unit 154 but also used for the loop filter unit 120, and/or so that, for example, the buffer unit 116 and the decoded picture buffer unit 130 form one buffer. Further embodiments may be configured to use filtered blocks 121 and/or blocks or samples (both not depicted in FIG. 2) from the decoded picture buffer 130 as an input or a basis for the intra prediction unit 154.

The loop filter unit 120 (briefly referred to as a "loop filter" 120) is configured to filter the reconstruction block 115 to obtain a filtered block 121, to smooth pixel transition or improve video quality. The loop filter unit 120 is intended to represent one or more loop filters including, for example, a deblocking filter, a sample-adaptive offset (sample-adaptive offset, SAO) filter, and another filter such as a bilateral filter, an adaptive loop filter (adaptive loop filter, ALF), a sharpening or smoothing filter, or a collaborative filter. Although the loop filter unit 120 is shown in FIG. 2 as an in-loop filter, in other configurations, the loop filter unit 120 may be implemented as a post-loop filter. The filtered block 121 may also be referred to as a filtered reconstruction block 121. The decoded picture buffer 130 may store reconstructed coding blocks after the loop filter unit 120 performs the filtering operation on the reconstructed coding blocks.

In an embodiment, the encoder 100 (correspondingly, the loop filter unit 120) may be configured to output a loop filter parameter (such as sample adaptive offset information), for example, directly or after entropy encoding performed by the entropy encoding unit 170 or any other entropy encoding unit, so that, for example, the decoder 200 can receive the same loop filter parameter and apply the same loop filter parameter to decoding.

The decoded picture buffer (DPB) 130 may be a reference picture memory that stores reference picture data for use in encoding video data by the video encoder 100. The DPB 130 may be formed by any one of a variety of memory devices, such as a dynamic random access memory (dynamic random access memory. DRAM) (including a synchronous DRAM (synchronous DRAM, SDRAM), a magnetoresistive RAM (magnetoresistive RAM, MRAM), and a resistive RAM (resistive RAM. RRAM)), or another type of memory devices. The DPB 130 and the buffer 116 may be provided by a same memory device or separate memory devices. In an example, the decoded picture buffer (decoded picture buffer, DPB) 130 is configured to store the filtered block 121. The decoded picture buffer 130 may be further configured to store another previously filtered block, for example, the previously reconstructed and filtered block 121, of a same current picture or of different pictures, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstruction block 115 is reconstructed but without in-loop filtering, the decoded picture buffer (DPB) 130 is configured to store the reconstruction block 115.

The prediction processing unit 160, also referred to as a block prediction processing unit 160, is configured to receive or obtain the block 103 (a current encoding picture block 103 of the current picture 101) and reconstructed picture data, for example, reference samples of a same (current) picture from the buffer 116 and/or reference picture data 231 of one or more previously decoded pictures from the decoded picture buffer 130, and to process such data for prediction, that is, to provide the prediction block 165 that may be an inter prediction block 145 or an intra prediction block 155.

In the embodiments of this application, the inter prediction unit 145 may include a set of candidate interpolation filters 151 and a filter selection unit 152. The set of candidate interpolation filters 151 may include a plurality of types of interpolation filters. For example, the set of candidate interpolation filters 151 may include a discrete cosine transform-based interpolation filter (DCT-based interpolation filter, DCTIF) and an invertibility-driven interpolation filter (invertibility-driven interpolation filter, also referred to as InvIF in this specification). The InvIF is an interpolation filter obtained by using the interpolation filter training method described in FIG. 6A or FIG. 6C in this application. The filter selection unit 152 is configured to select, or configured to select, by combining the filter selection unit 152 with other units (such as the transform processing unit 106, the quantization unit 108, the inverse transform processing unit 112, the reconstruction unit 114, the loop filter unit 120, and the transform processing unit 106), an interpolation filter (for example, the DCTIF or the InvIF) from the set of candidate interpolation filters 151. The entropy encoding unit is configured to entropy encode indication information of the selected interpolation filter (also referred to as a target interpolation filter in this specification). In another embodiment of this application, multiple types of interpolation filters included in the set of candidate interpolation filters 151 may all be interpolation filters provided in conventional technologies, or may include interpolation filters obtained by using the interpolation filter training method shown in FIG. 6A or FIG. 6C. In still another embodiment of this application, the inter prediction unit 145 may include a single interpolation filter obtained by using the interpolation filter training method shown in FIG. 6A or FIG. 6C in the embodiments of this application. It should be understood that the set of candidate interpolation filters 151 may be applied to a motion estimation process. In another embodiment of this application, the set of candidate interpolation filters 151 may be applied to another scenario in which an interpolation operation is required.

The encoder 100 may further include a training unit (not depicted in FIG. 2), configured to implement training of an interpolation filter. The training unit may be disposed inside or outside the inter prediction unit 145. It can be understood that the training unit may be disposed inside the inter prediction unit 145, or may be disposed at another position of the encoder 100. The training unit is coupled to one or more interpolation filters in the inter prediction unit, to implement training of an interpolation filter, update of a filter parameter of the interpolation filter, and the like. It can be understood that the training unit may alternatively be disposed outside the encoder or disposed in another device (a device that does not include the encoder 100), and the encoder may configure the interpolation filter by receiving a filter parameter.

The mode selection unit 162 may be configured to select a prediction mode (for example, an intra prediction mode or an inter prediction mode) and/or a corresponding prediction block 145 or 155 to be used as the prediction block 165 for calculation of the residual block 105 and for reconstruction of the reconstruction block 115.

In an embodiment, the mode selection unit 162 may be configured to select the prediction mode (for example, from prediction modes supported by the prediction processing unit 160). The prediction mode provides optimal match or a minimum residual (the minimum residual means better compression for transmission or storage), or provides minimum signaling overheads (the minimum signaling overheads mean better compression for transmission or storage), or considers or balances both. The mode selection unit 162 may be configured to determine the prediction mode based on rate distortion optimization (rate distortion optimization, RDO), that is, select a prediction mode that provides minimum rate distortion optimization or select a prediction mode for which related rate distortion at least satisfies a prediction mode selection criterion.

In the following, prediction processing (for example, performed by the prediction processing unit 160) and mode selection (for example, performed by the mode selection unit 162) performed by the example encoder 100 are to be explained in detail.

As described above, the encoder 100 is configured to determine or select a best prediction mode or an optimal prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

A set of (possible) inter prediction modes depends on available reference pictures (namely, for example, at least some decoded pictures stored in the DBP 130, as described above) and other inter prediction parameters, for example, depends on whether an entire reference picture or only a part of the reference picture, for example, a search window around a current picture block, is used to search for an optimal matched reference block, and/or for example, depends on whether pixel interpolation such as half-pixel and/or quarter-pixel interpolation is applied.

In addition to the foregoing prediction modes, a skip mode and/or a direct mode may also be applied.

The prediction processing unit 160 may be further configured to partition the block 103 into smaller block partitions or sub-blocks, for example, by iteratively using quad-tree (quad-tree, QT) partitioning, binary-tree (binary-tree, BT) partitioning, triple-tree (triple-tree, TT) partitioning, or any combination thereof, and to perform, for example, prediction on each of the block partitions or sub-blocks, where mode selection includes selection of a tree structure of the partitioned block 103 and selection of a prediction mode applied to each of the block partitions or sub-blocks.

The inter prediction unit 144 may include a motion estimation (motion estimation, ME) unit (not depicted in FIG. 2) and a motion compensation (motion compensation, MC) unit (not depicted in FIG. 2). The motion estimation unit is configured to receive or obtain the picture block 103 (the current picture block 103 of the current picture 101) and the decoded picture 231, or at least one or more previously reconstructed blocks, for example, reconstructed blocks of one or more other/different previously decoded pictures 231, for motion estimation. For example, a video sequence may include a current picture and the previously decoded picture 231. In other words, the current picture and the previously decoded picture 231 may be a part of or form a sequence of pictures forming a video sequence.

For example, the encoder 100 may be configured to select a reference block from a plurality of reference blocks of a same picture or different pictures of a plurality of other pictures, and provide, for the motion estimation unit (not depicted in FIG. 2), a reference picture (or a reference picture index) and/or an offset (a spatial offset) between a position (X, Y coordinates) of the reference block and a position of the current block as inter prediction parameters. This offset is also referred to as a motion vector (motion vector, MV).

In the embodiments of this application, the motion estimation unit may include a set of candidate interpolation filters. The motion estimation unit is further configured to select, from the set of candidate interpolation filters according to a rate-distortion cost criterion, a target interpolation filter used for a current encoding picture block. Alternatively, the motion estimation unit is further configured to perform sub-pixel interpolation for an integer pixel reference picture block that optimally matches the current encoding picture block by using each interpolation filter in the set of candidate interpolation filters, to obtain N sub-pixel reference picture blocks. Further, a prediction block that optimally matches the current encoding picture block is determined in the integer pixel reference picture block and the N sub-pixel reference picture blocks, and an interpolation filter that is of the prediction block obtained through interpolation and that is selected from the set of candidate interpolation filters is the target interpolation filter.

The motion compensation unit is configured to obtain, for example, receive, an inter prediction parameter, and perform inter prediction based on or using the inter prediction parameter to obtain the inter prediction block 145. Motion compensation performed by the motion compensation unit (not depicted in FIG. 2) may include extracting or generating a prediction block based on a motion/block vector determined through motion estimation (interpolation may be performed at a sub-sample precision level). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 146 may locate a prediction block to which the motion vector points in one of the reference picture lists. The motion compensation unit 146 may further generate a syntax element associated with a block and a video slice, for use by the video decoder 200 in decoding a picture block of the video slice.

The intra prediction unit 154 is configured to obtain, for example, receive, the picture block 103 (the current picture block) and one or more previously reconstructed blocks, for example, reconstructed neighboring blocks, of a same picture for intra estimation. The encoder 100 may, for example, be configured to select an intra prediction mode from a plurality of (predetermined) intra prediction modes.

In an embodiment, the encoder 100 may be configured to select the intra prediction mode according to an optimization criterion, for example, based on a minimum residual (for example, an intra prediction mode providing the prediction block 155 that is most similar to the current picture block 103) or minimum rate distortion.

The intra prediction unit 154 is further configured to determine the intra prediction block 155 based on an intra prediction parameter of, for example, the selected intra prediction mode. In any case, after selecting an intra prediction mode for a block, the intra prediction unit 154 is also configured to provide an intra prediction parameter, that is, information indicative of the selected intra prediction mode for the block for the entropy encoding unit 170. In an example, the intra prediction unit 154 may be configured to perform any combination of the following intra prediction techniques.

The entropy encoding unit 170 is configured to apply an entropy encoding algorithm or scheme (for example, variable length coding (VLC) scheme, an context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 109, inter prediction parameters, intra prediction parameter, and/or loop filter parameters, individually or jointly (or not at all) to obtain encoded picture data 171 which can be output by the output 172, for example, in the form of an encoded bitstream 171. The encoded bitstream may be transmitted to the video decoder 200, or archived for later transmission or retrieval by the video decoder 200. The entropy encoding unit 170 may be further configured to entropy encode another syntax element for a current video slice being encoded. For example, in some embodiments of the present disclosure, the entropy encoding unit 170 is further configured to entropy encode the indication information of the target interpolation filter and/or the filter parameter of the interpolation filter.

The training unit is configured to train, based on a sample picture, an interpolation filter that is based on machine learning and that is included in the inter prediction unit 144, to determine or optimize a filter parameter of the interpolation filter.

Other structural variants of the video encoder 100 can be configured to encode a video stream. For example, a non-transform based encoder 100 can quantize a residual signal directly without the transform processing unit 106 for some blocks or frames. In another implementation, the encoder 100 includes the quantization unit 108 and the inverse quantization unit 110 that can be combined into a single unit.

FIG. 3 shows an example video decoder 200, configured to implement technologies of this application, that is, a video picture decoding method. The video decoder 200 is configured to receive the encoded picture data (for example, an encoded bitstream) 171, for example, encoded by the encoder 100, to obtain a decoded picture 231. In a decoding process, the video decoder 200 receives video data from the video encoder 100, for example, an encoded video bitstream that represents a picture block of an encoded video bitstream (which is also referred to as a bitstream) and associated syntax elements.

In the example of FIG. 3, the decoder 200 includes an entropy decoding unit 204, an inverse quantization unit 210, an inverse transform processing unit 212, a reconstruction unit 214 (for example, a summer 214), a buffer 216, a loop filter 220, a decoded picture buffer 230, and a prediction processing unit 260. The prediction processing unit 260 may include an inter prediction unit 244, an intra prediction unit 254, and a mode selection unit 262. The video decoder 200 may, in some examples, perform a decoding pass generally reciprocal to the encoding pass described with respect to the video encoder 100 in FIG. 2.

The entropy decoding unit 204 is configured to entropy decode the encoded picture data (for example, a bitstream or a current decoding picture block) 171 to obtain, for example, quantized coefficients 209 and/or decoded encoding parameters (also referred to as encoding information, not depicted in FIG. 3), for example, any one or all of (decoded) syntax elements such as an inter prediction parameter, an intra prediction parameter, a loop filter parameter, indication information of a target interpolation filter, a filter parameter, and/or information indicating an inter prediction mode. The entropy decoding unit 204 is further configured to forward, to the prediction processing unit 260, the syntax elements such as the inter prediction parameter, the intra prediction parameter, the indication information of the target interpolation filter, the filter parameter, and/or the information indicating the inter prediction mode. The video decoder 200 may receive the syntax elements at a video slice level and/or a video block level.

The inverse quantization unit 210 may have a same function as the inverse quantization unit 110. The inverse transform processing unit 212 may have a same function as the inverse transform processing unit 112. The reconstruction unit 214 may have a same function as the reconstruction unit 114. The buffer 216 may have a same function as the buffer 116. The loop filter 220 may have a same function as the loop filter 120. The decoded picture buffer 230 may have a same function as the decoded picture buffer 130.

The prediction processing unit 260 may include the inter prediction unit 244 and the intra prediction unit 254. The inter prediction unit 244 may resemble the inter prediction unit 144 in functions, and the intra prediction unit 254 may resemble the intra prediction unit 154 in functions. The prediction processing unit 260 is typically configured to perform block prediction and/or obtain a prediction block 265 from the encoded data 171 and to receive or obtain (explicitly or implicitly) the prediction related parameters and/or the information about the selected prediction mode, for example, from the entropy decoding unit 204.

When the video slice is coded as an intra coded (I) slice, the intra prediction unit 254 of the prediction processing unit 260 is configured to generate a prediction block 265 for a picture block of the current video slice based on a signaled intra prediction mode and data from previously decoded blocks of the current frame or picture. When a video frame is encoded into an inter encoded (namely, B or P) slice, the inter prediction unit 244 (for example, a motion compensation unit) in the prediction processing unit 260 is configured to generate the prediction block 265 of a video block in the current video slice based on a motion vector and another syntax element that is received from the entropy decoding unit 204. For inter prediction, the prediction block may be generated from one of reference pictures in one reference picture list. The video decoder 200 may construct reference frame lists: a list 0 and a list 1, by using a default construction technique based on reference pictures stored in the DPB 230.

The prediction processing unit 260 is configured to: parse a motion vector: perform sub-pixel interpolation to obtain syntax elements such as indication information of a target interpolation filter of a prediction block, a filter parameter, and/or information used to indicate an inter prediction mode: determine the target interpolation filter used for performing sub-pixel interpolation; determine prediction information of a video block (that is, a current decoding picture block) of a current video slice; and generate a prediction block of the current decoding picture block based on the prediction information. For example, the prediction processing unit 260 uses some of received syntax elements to determine a prediction mode (for example, intra prediction or inter prediction) used to code a video block of a video slice, an inter prediction slice type (for example, a B slice, a P slice, or a GPB slice), construction information for one or more of the reference picture lists for the slice, a motion vector for each inter coded video block of the slice, an inter prediction status for each inter-coded video block of the slice, indication information of a target interpolation filter of a prediction block obtained through sub-pixel interpolation and other information, to decode the video block of the current video slice.

The prediction processing unit 260 may include a set of candidate interpolation filters 251 and a filter selection unit 252. The set of candidate interpolation filters 251 includes one or more types of interpolation filters, for example, a DCTIF and an InvIF. The filter selection unit 252 is configured to: if motion information points to a fractional pixel position, determine, from the set of candidate interpolation filters 251, a target interpolation filter indicated by indication information of the target interpolation filter, where the indication information is obtained through parsing; and perform sub-pixel interpolation by using the target interpolation filter indicated by the indication information to obtain the prediction block.

The inverse quantization unit 210 may be configured to inverse quantize (namely, dequantize) a quantized transform coefficient that is provided in the bitstream and that is decoded by the entropy decoding unit 204. The inverse quantization process may include use of a quantization parameter calculated by the video encoder 100 for each video block in the video slice to determine a degree of quantization and, likewise, a degree of inverse quantization that should be applied.

The inverse transform processing unit 212 is configured to apply an inverse transform (for example, an inverse DCT, an inverse integer transform, or a conceptually similar inverse transform process) to the transform coefficient to generate a residual block in a pixel domain.

The reconstruction unit 214 (for example, the summer 214) is configured to add an inverse transform block 213 (for example, a reconstructed residual block 213) to the prediction block 265 to obtain the reconstruction block 215 in the sample domain, for example, by adding the sample values of the reconstructed residual block 213 and the sample values of the prediction block 265.

The loop filter unit 220 (during a coding loop or after a coding loop) is configured to filter the reconstruction block 215 to obtain a filtered block 221, to smooth pixel transition or improve video quality. In an example, the loop filter unit 220 may be configured to perform any combination of filtering techniques described below: The loop filter unit 220 is intended to represent one or more loop filters including, for example, a deblocking filter, a sample-adaptive offset (sample-adaptive offset, SAO) filter, and another filter such as a bilateral filter, an adaptive loop filter (adaptive loop filter, ALF), a sharpening or smoothing filter, or a collaborative filter. Although the loop filter unit 220 is shown in FIG. 3 as an in-loop filter, in other configurations, the loop filter unit 220 may be implemented as a post-loop filter.

The decoded video blocks 221 in a given frame or picture are then stored in decoded picture buffer 230, which stores reference pictures used for subsequent motion compensation.

The decoder 200 is configured to output the decoded picture 231, for example, through an output 232, for presentation or viewing to a user.

Other variants of the video decoder 200 may be configured to decode a compressed bitstream. For example, the decoder 200 may generate an output video stream without the loop filter unit 220. For example, a non-transform based decoder 200 can inversely quantize a residual signal directly without the inverse transform processing unit 212 for some blocks or frames. In another implementation, the video decoder 200 has the inverse-quantization unit 210 and the inverse-transform processing unit 212 that can be combined into a single unit.

It should be understood that, although FIG. 2 and FIG. 3 respectively show the specific encoder 100 and the specific decoder 200, the encoder 100 and the decoder 200 each may further include various other functional units, modules, or components that are not described. In addition, specific components shown in FIG. 2 and FIG. 3 and/or arrangement manners of the specific components shown in FIG. 2 and FIG. 3 are not limited. Various units of the system described in this specification may be implemented in software, firmware, and/or hardware, and/or any combination thereof.

The following describes invertibility of sub-pixel interpolation related to this application.

It should be understood that each digital picture may be considered as a two-dimensional array with m rows and n columns, and include m×n samples (sample). A position of each sample is referred to as a sampling position, and a value of each sample is referred to as a sample value. Generally, m×n is referred to as a resolution of a picture, that is, a quantity of samples included in the picture. For example, a resolution of a 2K picture is 1920×1080, and a resolution of a 4K video is 3840×2160. Generally, a sample is also referred to as a pixel, and a sample value is also referred to as a pixel value. Therefore, each pixel also includes two pieces of information: a pixel position and a pixel value.

A plurality of digital pictures in a chronological order constitute a digital video. Coding of the digital video is used to remove redundant information in the digital video, for ease of storage and network transmission. Generally, redundancy of the digital video includes spatial redundancy, temporal redundancy, statistical redundancy, and visual redundancy. There is a strong correlation between adjacent frames in a video sequence, and there is a large amount of temporal redundancy. To remove the temporal redundancy, an inter prediction technology is introduced to a current block-based hybrid coding framework, to predict a current to-be-coded frame by using a coded frame, thereby greatly reducing a coding bitrate.

Figure 4:
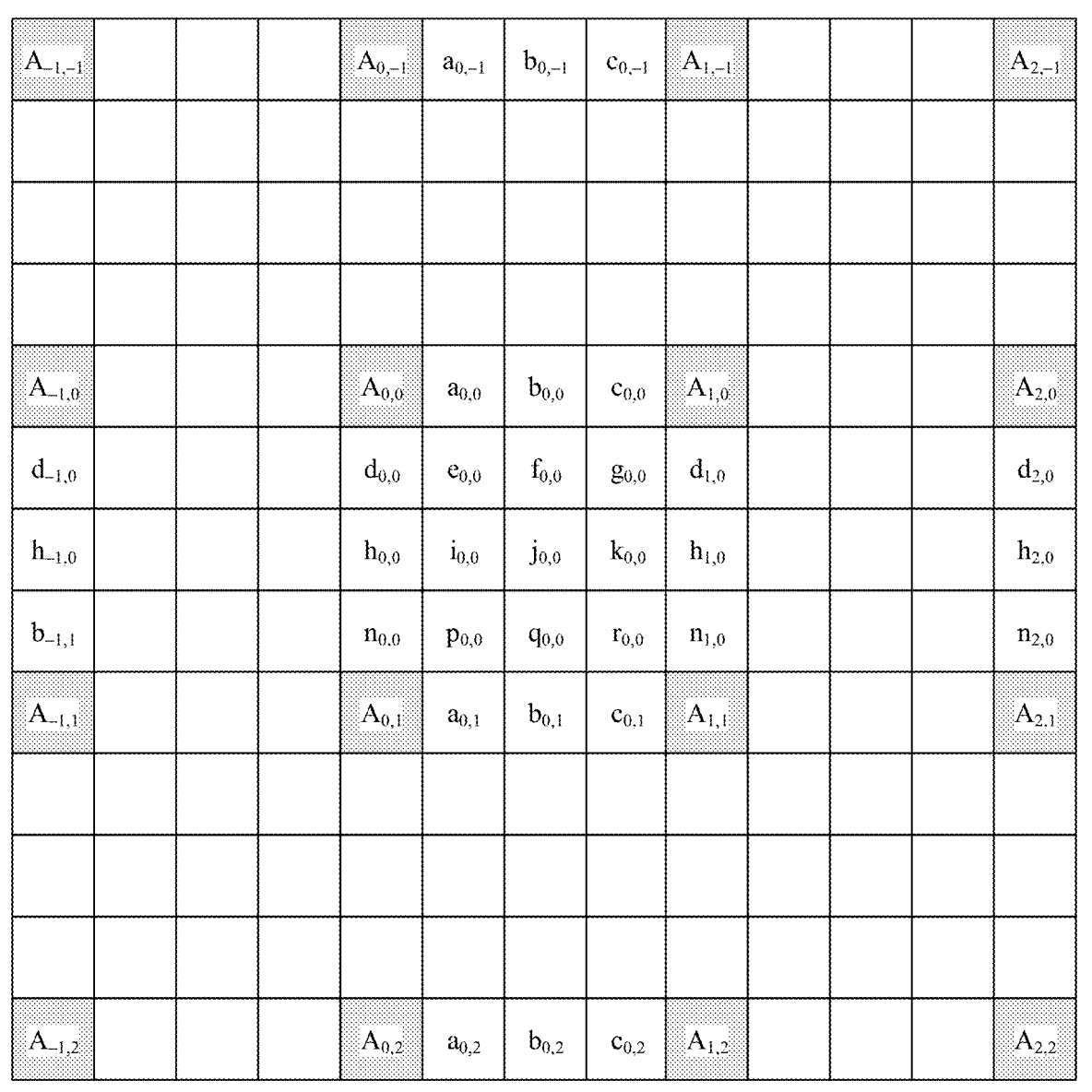

In block-based inter prediction, a current to-be-coded picture is first divided into several non-overlapping coding units (CUs). Each CU has its own coding mode. Each CU may be further divided into several prediction units (PU), and each PU has a prediction mode, for example, a prediction direction or a motion vector (MV). On an encoder side, a matched block in a reference frame may be found for each PU, and a position of the matched block is identified by using an MV. In a digital sampling process, sample values of some positions (referring to fractional pixel positions) of a picture are not sampled. Therefore, a block that completely matches the current block may not be found in the reference frame. In this case, a sub-pixel interpolation technology is used to perform interpolation to generate a pixel value of a fractional pixel position. FIG. 4 is a schematic diagram of positions of integer pixels and sub-pixels. Uppercase letters indicate integer pixel positions, and lowercase letters indicate different fractional pixel positions. Pixel values of different fractional pixel positions are generated through interpolation by using different interpolation filters based on integer pixels, and an interpolated block is used as a reference block.

For example, for an interpolation process shown in FIG. 4, precision of a motion vector is ¼. When motion estimation is performed, an integer pixel picture block that optimally matches a current to-be-encoded picture block is first found. Then, eight ½-pixel sub-pixel picture blocks are generated through interpolation by using a ½-precision interpolation filter. Matching is performed between the current to-be-encoded picture block and the following blocks: the eight ½-pixel picture blocks and the integer pixel picture block, to obtain an optimal matched motion vector with ½ precision. An interpolation filter with ¼ precision is used to perform interpolation for an optimal matched pixel block to which the optimal matched motion vector with ½ precision points, to obtain eight sub-pixel blocks with ¼ precision. The optimal matched block with ½ precision and the eight sub-pixel blocks with ¼ precision are searched for an optimal matched picture block, and the optimal matched picture block is used as a prediction block of the current to-be-encoded picture block. A motion vector indicated by a position of the matched picture block is a motion vector of the current to-be-encoded picture block.

In digital video coding, the concepts of integer pixel and sub-pixel are resulting from discreteness of digital sampling. FIG. 5($a$) is a schematic diagram of digital sampling, where points represent sampled samples, dashed lines represent raw analog signals s(t), and solid lines represent signals obtained through interpolation (referred to as interpolation signals). In a digital sampling process, only sample values of specific positions (integer pixel positions) are sampled, and sample values of other positions are discarded. Interpolation is an inverse process of digital sampling. A purpose of interpolation is to maximally restore continuous raw signals from discrete sample values, and obtain sample values of specific positions (fractional pixel positions). As shown in FIG. 5($a$), a target position (a fractional pixel position) $\alpha$ may be obtained through interpolation based on sample values of positions neighboring to the target position. An interpolation process is described as follows:

$$p_\alpha = f_\alpha(s_{-M}, s_{-M+1}, \ldots, s_0, s_1, \ldots, s_N) \quad (1)$$

$s_i$ represents a sample value of an integer pixel position i, i represents an index of the integer pixel position, and i is an integer. $f_\alpha$ represents an interpolation filter corresponding to the fractional pixel position $\alpha$. M and N are positive integers, and $-M < \alpha < N$.

As shown in FIG. 5($b$), if the raw signals are flipped along the vertical coordinate axis, s'(t)=s(−t) may be obtained. Then, a sampler is leftward translated by $\alpha$ to obtain a sample $s'_i$ through sampling, where the sample $s'_i$ corresponds to a sub-pixel $p_\alpha$ in FIG. 5(a). Because a distance between an integer pixel and a sub-pixel in FIG. 5(b) is the same as a distance between an integer pixel and a sub-pixel in FIG. 5(a), a sample value of a fractional pixel position in FIG. 5(b) may also be obtained through interpolation by using $f_\alpha$, that is:

$$u_0 = f_\alpha(s'_{-\alpha-M}, s'_{-\alpha-M+1}, \ldots, s'_{-\alpha}, s'_{-\alpha+1}, \ldots, s'_{-\alpha+N}) \quad (2)$$

Because $s'(t) = s(-t-\alpha)$, Formula (2) may alternatively be expressed as:

$$u_0 = f_\alpha(s_{\alpha+M}, s_{\alpha+M-1}, \ldots, s'_{-\alpha}, s'_{-\alpha+1}, \ldots, s'_{\alpha+N}) \quad (3)$$

It can be learned from Formula (2) and Formula (3) that, if there is an ideal interpolation filter that can be used to obtain a sample of a fractional pixel position through interpolation, that is:

$$p_{\alpha+k} = s_{\alpha+k} \quad (4)$$

In this case, an interpolation filter in FIG. 5(b) can also be used to restore an integer pixel position from the fractional pixel position, that is:

$$u_k = s_{-k} \quad (5)$$

It can be learned from Formula (4) and Formula (5) that, if there is a filter that can be used to completely restore a sub-pixel sample value from an integer pixel sample value, the filter can also be used to restore the integer pixel position from the fractional pixel position. Such a feature is referred to as invertibility of sub-pixel interpolation. Based on the invertibility of sub-pixel interpolation, this application provides an end-to-end training method to generate an interpolation filter.

Based on the invertibility of sub-pixel interpolation, the embodiments of the present disclosure provide two interpolation filter training methods. The interpolation filter training method may be run in an encoder or a computing device. The computing device may include but is not limited to a computer, a cloud computing device, a server, a terminal device, and the like.

In conventional technologies, interpolation filters with fixed coefficients are usually used, for example, bilinear interpolation filters or bicubic interpolation filters. Currently, the interpolation filters with fixed coefficients are widely used in video coding standards. In H.264/AVC, a 6-tap finite response filter is used to generate a half-pixel sample value, and a simple bilinear interpolation is used to generate a quarter pixel sample value. In comparison with interpolation filters in H.264/AVC, much improvement has been made to interpolation filters in HEVC. An 8-tap filter is used to generate a half pixel sample value, and a 7-tap interpolation filter is used to generate a quarter pixel sample value. The interpolation filters with fixed coefficients are easy to implement and has low complexity, and therefore they are widely used. However, due to diversity and non-stationarity of video signals, performance of the filters with a fixed coefficient is very limited.

To cope with non-stationarity of natural videos, content-adaptive interpolation filters are proposed in researches. A typical adaptive interpolation filter is used to estimate a filter coefficient on the encoder side based on an error motion compensation prediction, and then the filter coefficient is encoded and written into a bitstream. To decrease complexity of the interpolation filter, a separable adaptive interpolation filter is proposed, which can significantly decrease the complexity while basically ensuring coding performance. To reduce a quantity of bits required for coding a filter coefficient, some adaptive interpolation filters are generally designed under the assumption that pictures are isotropic. Although the adaptive interpolation filter is content-adaptive, the adaptive interpolation filter is still based on the linear interpolation filter. In addition, some bits are still required for coding the filter coefficient.

In view of the foregoing technical problem, the embodiments of this application provide an interpolation filter training method. FIG. 6A is a schematic flowchart of an interpolation filter training method according to an embodiment of this application, and FIG. 6B is a schematic illustrative diagram of a training procedure. The method includes but is not limited to a part of or all the following steps:

S612: Perform interpolation on a pixel, of a sample picture, at an integer pixel position by using a first interpolation filter, to obtain a first sub-pixel picture of the sample picture at a first fractional pixel position.

S614: Input the sample picture into a second interpolation filter, to obtain a second sub-pixel picture.

S616: Determine a filter parameter of the second interpolation filter by minimizing a first function that is used to represent a difference between the first sub-pixel picture and the second sub-pixel picture.

It should be noted that, although the method in this embodiment of this application is represented by using steps, step S612 and step S616 are an iterative process in a training process.

In an implementation of this embodiment of this application, the sample picture may be a raw picture X or a picture X' obtained by encoding and compressing the raw picture X by an encoder. However, in another implementation of this embodiment of this application, the sample picture that is input to the first interpolation filter is a raw picture, and the sample picture that is input to the second interpolation filter may be a picture obtained by encoding and compressing the sample picture by the encoder.

It should be understood that the first interpolation filter is any conventional-technology interpolation filter that can perform interpolation to generate a pixel value of the first fractional pixel position. The first interpolation filter may be an interpolation filter with a fixed coefficient, an adaptive interpolation filter, an interpolation filter of another type, or the like. This is not limited in this embodiment of this application. The first fractional pixel position may be any fractional pixel position. It can be learned that in this embodiment of this application, the first sub-pixel picture is used as label data to train the second interpolation filter, so that the second interpolation filter obtained through training can be directly used for the pixel value, obtained through interpolation, of the first fractional pixel position.

It should be further understood that the second interpolation filter may be a support vector machine (support vector machine, SVM), a neural network (neural network, NN), a convolutional neural network (convolutional neural network, CNN), or another form. This is not limited in this embodiment of this application.

The first function may be a function that is used to represent the difference between the first sub-pixel picture and the second sub-pixel picture. The first function may be a loss function, a target function, a cost function, or the like. This is not limited in this embodiment of this application.

For example, the first function is a regularization loss function (regularization loss function), and the first function may be expressed as:

$$L_{reg,\gamma} = \|X_{f,\gamma} - TIF_\gamma(X)\|_2^2 = \|F_\gamma(X') - TIF_\gamma(X)\|_2^2 \quad (6)$$

γ represents an index of a fractional pixel position, $L_{reg,\gamma}$ represents the first function corresponding to the fractional pixel position γ, X represents the sample picture, X' represents a picture obtained by compressing the sample picture by the encoder, $TIF_\gamma$ represents the first interpolation filter corresponding to the fractional pixel position γ, F represents the second interpolation filter, $TIF_\gamma(X)$ represents the first sub-pixel picture corresponding to the fractional pixel position γ, and $X_{f,\gamma}$ and $F_\gamma(X')$ represent second sub-pixel pictures corresponding to the fractional pixel position γ. A norm symbol $$\|x\|_2 = \left(\sum_{i=1}^{N} |x_i|^2\right)^{\frac{1}{2}},$$

where i represents an index of a pixel in x.

It should be understood that the first function may alternatively be specifically represented in another manner. For example, the first function may be a logarithmic loss function, a square loss function, an exponential loss function, or a loss function in another form. This is not limited in this embodiment of this application.

It can be understood that there may be one or more sample pictures. One sample picture may be a frame of picture, a coding unit (CU), or a prediction unit (PU). This is not limited in the present disclosure.

The filter parameter of the second interpolation filter may be obtained by minimizing a loss function, and a training process may be expressed as:

$$\theta^* = \operatorname*{argmin}_{\theta} \sum_{k=1}^{n} L_{reg}^k \quad (7)$$

n represents a total quantity of sample pictures, and n is a positive integer. k represents an index of a sample picture, k is a positive integer, and k≤n. θ* represents an optimal filter parameter. θ represents the filter parameter. $L_{reg}^k$ represents a first function corresponding to a sample picture k. Optionally, n may be equal to 1 or another positive integer.

Optionally, the filter parameter of the second interpolation filter may be calculated by using a least square method (Least Square Method), linear regression (Linear Regression), gradient descent (gradient descent), or another method.

Because a sub-pixel picture corresponding to the integer pixel picture obtained through sampling cannot be obtained, there is no label data for an interpolation filter obtained through machine learning. In conventional technologies, label data that is used is obtained by using a method "blurring-sampling". To be specific, a sample picture is blurred by using a low-pass filter to increase a correlation between adjacent pixels. Then, several sub-pictures are obtained by sampling the picture according to different phases. A sub-picture corresponding to a phase 0 is considered as an integer pixel, and sub-pictures corresponding to other phases are considered as sub-pixels at different positions. However, label data obtained by using this method is manually designed, and therefore is not optimal.

It can be learned that in the interpolation filter training method provided in this embodiment of this application, sub-pixel interpolation is performed on the sample picture by using a conventional interpolation filter to obtain the first sub-pixel picture, and the first sub-pixel picture is used as label data. An interpolation filter (the second interpolation filter) is trained by monitoring the first sub-pixel picture, to obtain an interpolation filter. This can improve coding performance.

In an embodiment of the present disclosure, interpolation filters one-to-one corresponding to a plurality of fractional pixel positions may be trained together. A specific implementation method includes but is not limited to the following steps:

S1: Perform interpolation on a pixel of a sample picture at an integer pixel position by using a first interpolation filter corresponding to a fractional pixel position γ, to obtain a first sub-pixel picture of the sample picture at the fractional pixel position γ, where the fractional pixel position γ is any one of Q fractional pixel positions, and Q is a positive integer.

S2: Input the sample picture into a second interpolation filter corresponding to the fractional pixel position γ, to obtain a second sub-pixel picture corresponding to the fractional pixel position γ.

S3: Determine filter parameters of second interpolation filters one-to-one corresponding to the Q fractional pixel positions by minimizing first functions one-to-one corresponding to Q the fractional pixel positions, where the first function corresponding to the fractional pixel position γ is used to represent a difference between the first sub-pixel picture of the sample picture at the fractional pixel position γ and the second sub-pixel picture corresponding to the fractional pixel position γ.

Optionally, Q may be a total quantity of fractional pixel positions, or may be another value.

Figure 6D:
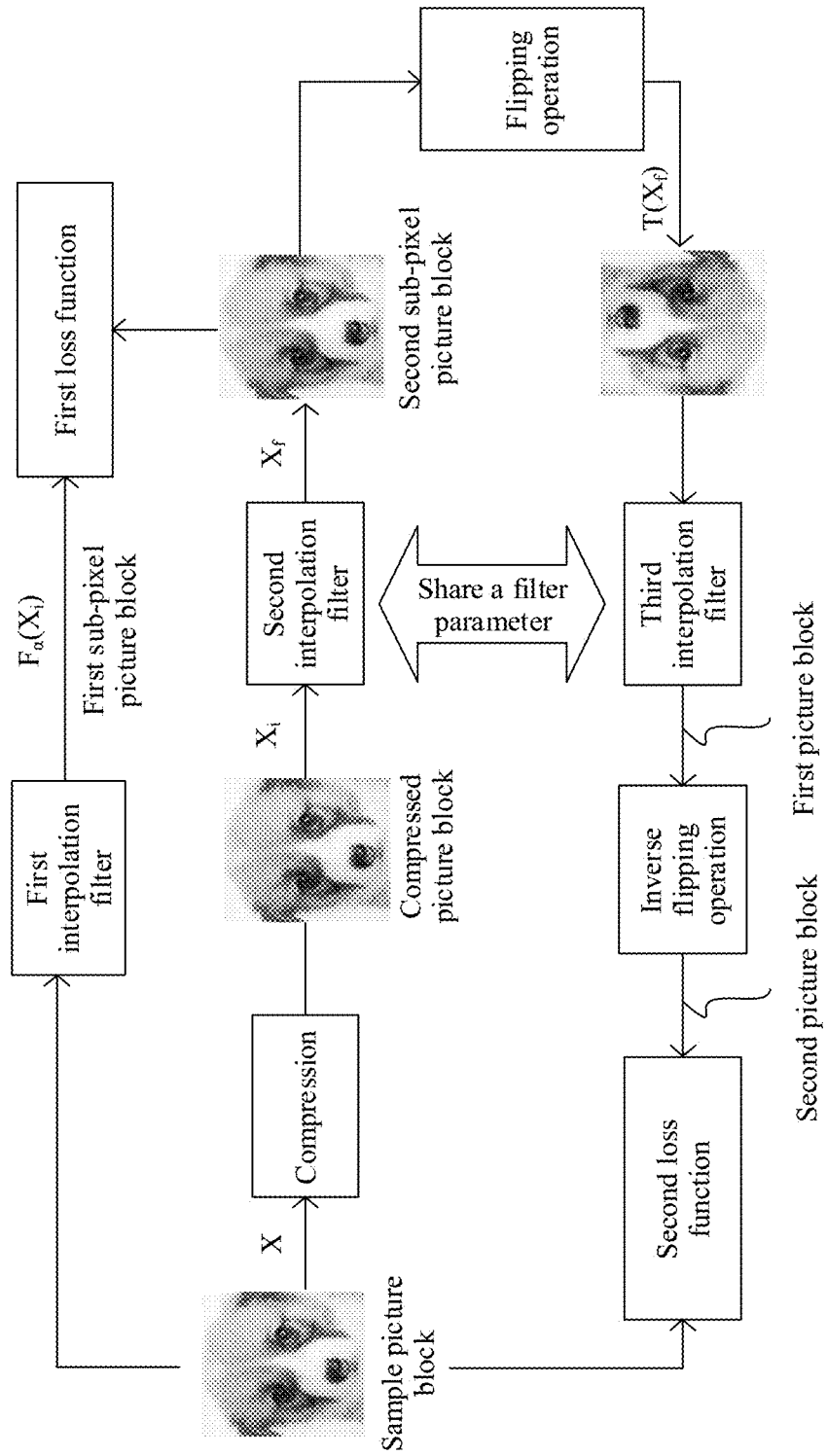
FIG. 6D is an illustrative schematic diagram of another interpolation filter training procedure according to an embodiment of this application.

FIG. 6C is a schematic flowchart of another interpolation filter training method according to an embodiment of this application, and FIG. 6D is a schematic illustrative diagram of a training procedure. The method includes but is not limited to a part of or all the following steps:

S622: Perform sub-pixel interpolation on a sample picture by using a first interpolation filter, to obtain a first sub-pixel picture of the sample picture at a first fractional pixel position.

S624: Input the sample picture into a second interpolation filter, to obtain a second sub-pixel picture.

S626: Input, to a third interpolation filter, the second sub-pixel picture on which a flipping operation is performed, to obtain a first picture, and perform an inverse operation of the flipping operation on the first picture to obtain a second picture, where the second interpolation filter and the third interpolation filter share a filter parameter.

S628: Determine the filter parameter based on a first function that is used to represent a difference between the first sub-pixel picture and the second sub-pixel picture and a second function that is used to represent a difference between the sample picture and the second picture.

It should be noted that, although the method in this embodiment of this application is represented by using steps, step S622 and step S628 are an iterative process in a training process.

For descriptions of the sample picture, the first function, and the first interpolation filter, refer to the related descriptions in the embodiments of the interpolation filter training method described in FIG. 6A and FIG. 6B. Details are not described again in this application.

A flipping operation T is performed on a sub-pixel picture $X_f$ that is generated through sub-pixel interpolation, then sub-pixel interpolation is performed by using the third interpolation filter to obtain the first picture, and then an inverse operation $T^{-1}$ of the flipping operation T is performed on the first picture to obtain a reconstructed picture of the sample picture, that is, the second picture. Both the first picture and the second picture are integer pixel pictures, and the flipping operation includes horizontal flipping, vertical flipping, and diagonal flipping. A type of flipping operation may be selected according to the following formula:

$$T = \begin{cases} y_f = 0, \text{ horizontal flipping} \\ x_f = 0, \text{ vertical flipping} \\ \text{Others, diagonal flipping} \end{cases}$$

$y_f$ represents a sub-pixel displacement of a flipped picture relative to the second sub-pixel picture in the horizontal direction, and $x_f$ represents a sub-pixel displacement of the flipped picture relative to the second sub-pixel picture in the vertical direction.

The second function may be a function that is used to represent the difference between the sample picture and the second picture. The second function may be a loss function, a target function, a cost function, or the like. This is not limited in this embodiment of this application.

For example, the second function may be represented as:

$$L_{rec,\gamma} = \left\| X - T^{-1}(F_\gamma T(X_f)) \right\|_2^2 = \left\| X - T^{-1}(F_\gamma (T(F_\gamma (X_{f,\gamma})))) \right\|_2^2 \quad (8)$$

$L_{rec,\gamma}$ represents the second function, X represents the sample picture, $\gamma$ represents the first fractional pixel position, $TIF_\gamma$ represents the first interpolation filter, F represents the second interpolation filter, $TIF_\gamma(X)$ represents the first sub-pixel picture, and $X_{f,\gamma}$ represents the second sub-pixel picture. $TT^{-1}=E$, where E represents a unit matrix.

It should be understood that the first function may alternatively be represented in another manner. For example, the first function may be a logarithmic loss function, a square loss function, an exponential loss function, or a loss function in another form. This is not limited in this embodiment of this application.

It can be learned that an entire optimization process of an end-to-end training framework is to minimize both the first function and the second function. In an embodiment of this application, an implementation of step S628 may be as follows:

determining the filter parameter by minimizing a third function, where the third function is a weighted sum between the first function that is used to represent the difference between the first sub-pixel picture and the second sub-pixel picture and the second function that is used to represent the difference between the sample picture and the second picture.

For example, a joint loss function (also referred to as the third function) is defined as follows:

$$L_{joint} = (1-\delta) \times L_{re} + \delta \times L_{reg} \quad (9)$$

The filter parameter of the second interpolation filter may be obtained by minimizing the joint loss function, and a training process may be expressed as:

$$\theta^* = \arg\min L_{joint}(\theta) \quad (10)$$

In an embodiment of this application, another implementation of step S628 may be as follows: determining the filter parameter by alternately minimizing a first loss function that is used to represent the difference between the first sub-pixel picture and the second sub-pixel picture and the second function that is used to represent the difference between the sample picture and the second picture.

Likewise, in the training method described in FIG. 6C and FIG. 6D, there may be one or more sample pictures. One sample picture may be a frame of picture, a coding unit (CU), or a prediction unit (PU). This is not limited in the present disclosure.

The filter parameter of the second interpolation filter may be obtained by minimizing a loss function, and a training process may be expressed as:

$$\theta^* = \underset{\theta}{\operatorname{argmin}} \sum_{k=1}^{n} L_{joint}^k \quad (11)$$

$$L_{joint}^k = (1-\delta)\lambda L_{rec}^k + \delta \times L_{reg}^k \quad (12)$$

n represents a total quantity of sample pictures, and n is a positive integer. k represents an index of a sample picture, k is a positive integer, and k≤n. $\theta^*$ represents an optimal filter parameter. $\theta$ represents the filter parameter. $L_{reg}^k$ represents a first function corresponding to the sample picture k. $L_{rec}^k$ represents a second function corresponding to the sample picture k. Optionally, n may be equal to 1 or another positive integer.

In comparison with the embodiment shown in FIG. 6A and FIG. 6B, in the interpolation filter training method provided in this embodiment of the present disclosure, sub-pixel interpolation is performed on the sample picture by using a conventional interpolation filter to obtain the first sub-pixel picture, and the first sub-pixel picture is used as label data. By using an invertibility principle of sub-pixel interpolation, the filter parameter is determined by minimizing the first function that is used to represent the difference between the first sub-pixel picture and the second sub-pixel picture and the second function that is used to represent the difference between the sample picture and the second picture, so that the second interpolation filter is constrained by monitoring the sample picture. This improves accuracy of sub-pixel interpolation by using the second interpolation filter.

Figure 7:
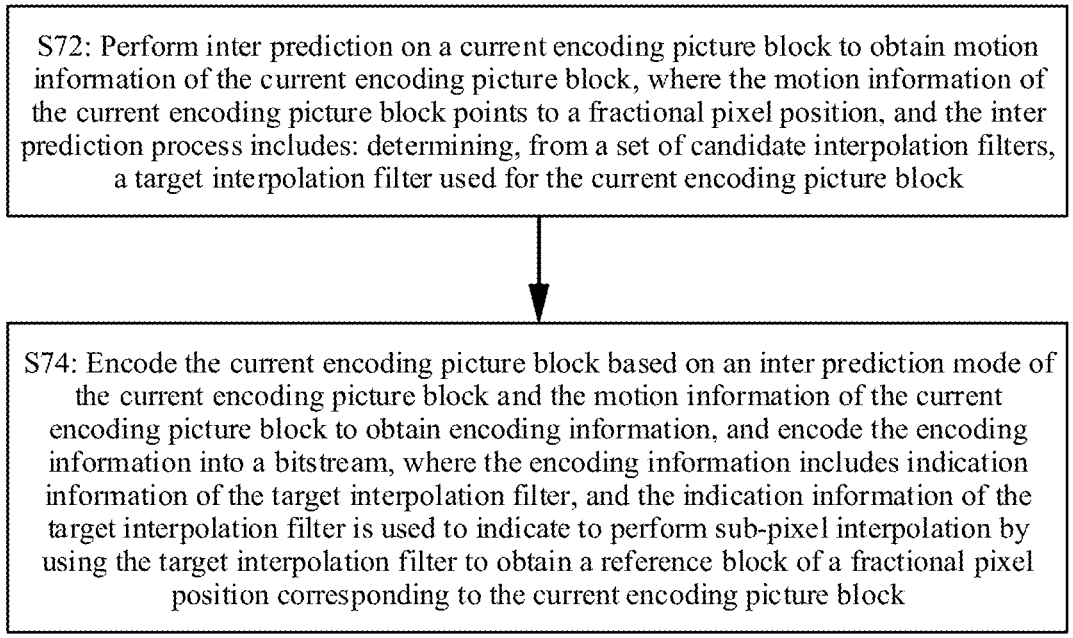
FIG. 7 is a schematic flowchart of a video picture encoding method according to an embodiment of this application.
Figure 8:
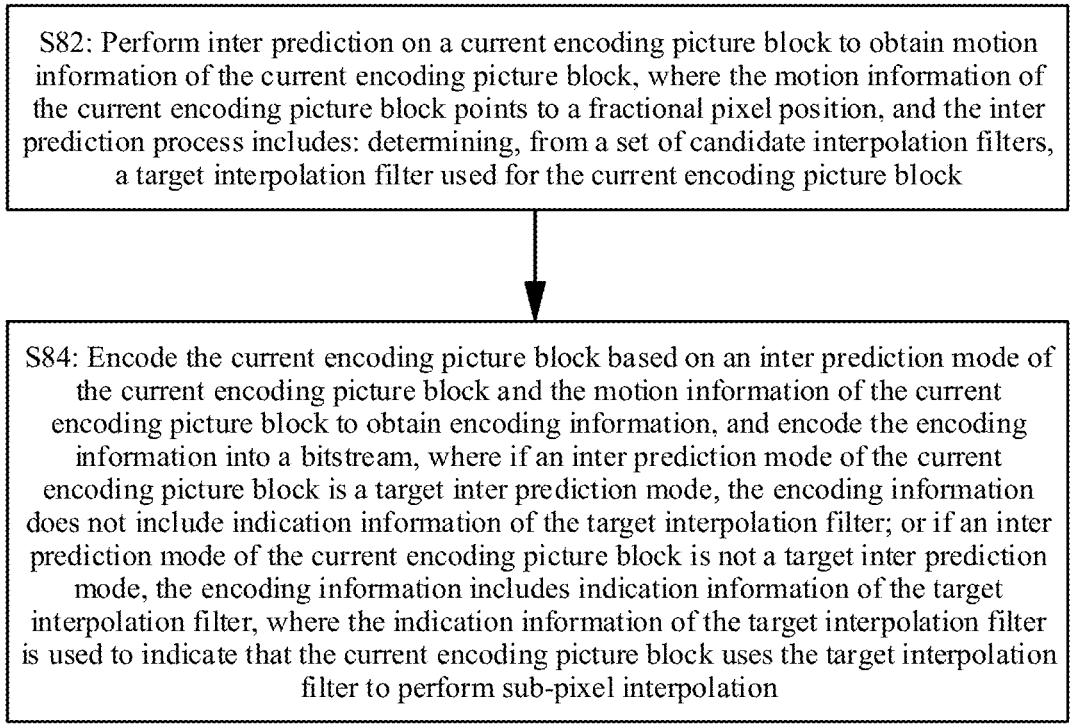
FIG. 8 is a schematic flowchart of another video picture encoding method according to an embodiment of this application.

Based on FIG. 7 and FIG. 8, the following describes two specific implementation processes of a video picture encoding method provided in the embodiments of the present disclosure. The method may be performed by the video encoder 100. The method is described through a series of steps or operations. It should be understood that steps of the method may be performed in various sequences and/or at the same time, and are not limited to an execution sequence shown in FIG. 7 and FIG. 8. It is assumed that the video encoder is being used for a video data stream including a plurality of video frames, and performs a process including the following steps to predict motion information of a current encoding picture block of a current video frame, and encodes the current encoding picture block based on an inter prediction mode of the current encoding picture block and motion information of the current encoding picture block.

As shown in FIG. 7, a first encoding implementation process is as follows:

S72: Perform inter prediction on a current encoding picture block to obtain motion information of the current encoding picture block, where the motion information of the current encoding picture block points to a fractional pixel position, and the inter prediction process includes: determining, from a set of candidate interpolation filters, a target interpolation filter used for the current encoding picture block.

S74: Encode the current encoding picture block based on an inter prediction mode of the current encoding picture block and the motion information of the current encoding picture block to obtain encoding information, and encode the encoding information into a bitstream, where the encoding information includes indication information of the target interpolation filter, and the indication information of the target interpolation filter is used to indicate to perform sub-pixel interpolation by using the target interpolation filter to obtain a reference block of a fractional pixel position corresponding to the current encoding picture block.

In the foregoing implementation, regardless of whether the inter prediction mode is a merge mode, when the motion information points to the fractional pixel position, the video encoder needs to encode the indication information of the target interpolation filter into the bitstream, so that a decoder side learns of a type of target interpolation filter of a prediction block obtained through encoding.

As shown in FIG. 8, a second encoding implementation process is as follows:

S82: Perform inter prediction on a current encoding picture block to obtain motion information of the current encoding picture block, where the motion information of the current encoding picture block points to a fractional pixel position, and the inter prediction process includes: determining, from a set of candidate interpolation filters, a target interpolation filter used for the current encoding picture block.

S84: Encode the current encoding picture block based on an inter prediction mode of the current encoding picture block and the motion information of the current encoding picture block to obtain encoding information, and encode the encoding information into a bitstream, where if the inter prediction mode of the current encoding picture block is a target inter prediction mode, the encoding information does not include indication information of the target interpolation filter: or if the inter prediction mode of the current encoding picture block is not a target inter prediction mode, the encoding information includes indication information of the target interpolation filter, where the indication information of the target interpolation filter is used to indicate that the current encoding picture block uses the target interpolation filter to perform sub-pixel interpolation.

In this embodiment of this application, the video encoder includes the set of candidate interpolation filters, the set of candidate interpolation filters may include a plurality of types of interpolation filters, and each type of interpolation filter may include one or more interpolation filters. When performing inter prediction on the current encoding picture block, the video coder may select one of the interpolation filters to perform sub-pixel interpolation, to obtain a prediction block of the current encoding picture block.

Optionally, the target interpolation filter is an interpolation filter of the prediction block obtained through sub-pixel interpolation or a type of interpolation filter of the obtained prediction block. In other words, the indication information of the target interpolation filter indicates the interpolation filter of the obtained prediction block, or may indicate the type of interpolation filter of the obtained prediction block.

For example, the set of candidate interpolation filters includes two types of interpolation filters, for example, a first-type interpolation filter and a second-type interpolation filter. When the target interpolation filter is the first-type interpolation filter, the indication information may be "0". When the target interpolation filter is the second-type interpolation filter, the indication information may be "1".

It can be understood that the first-type interpolation filter or the second-type interpolation filter may include one or more second interpolation filters, trained by using the foregoing interpolation filter training method, one-to-one corresponding to one or more fractional pixel positions.

In step S72/S82, the target interpolation filter is determined in implementations, which may include but not limited to the following two implementations.

First Implementation

The target interpolation filter used for the current encoding picture block is determined from the set of candidate interpolation filters according to a rate-distortion cost criterion. A specific implementation is as follows: calculating a rate-distortion cost, for each type of interpolation filter, of a sub-pixel picture block; and determining an interpolation filter with a smallest rate-distortion cost as the target interpolation filter of the prediction block that corresponds to the current encoding picture block and that is obtained through sub-pixel interpolation. For example, in a process of performing inter prediction on the current encoding picture block, the video encoder may find an integer pixel reference block that optimally matches the current encoding picture block, performs sub-pixel interpolation on an integer pixel reference picture block by using the first-type interpolation filter (any type of interpolation filter in the set of candidate interpolation filters) to obtain P sub-pixel reference picture blocks, determines a prediction block, obtains motion information of the prediction block, calculates a residual, encodes encoding information such as the residual and the motion information into a bitstream, reconstructs the picture block based on the bitstream, uses a mean square error between a reconstructed picture block and the current encoding picture block as a distortion, uses a size of an obtained bitstream as a bitrate, and further obtains a rate-distortion cost of the first-type interpolation filter based on the distortion and the bitrate. Calculation of the rate-distortion cost belongs to the conventional technologies, and details are not described herein. It should be understood that, in this application, although complete encoding operations and reconstruction are performed on the current encoding picture block in the inter prediction process, the process is a test process, and encoding information obtained in the process is not necessarily written into the bitstream. Optionally, only encoding information obtained in an encoding process in which a type of interpolation filter with a smallest rate-distortion cost participates is written into the bitstream.

It can be understood that P is a positive integer, and is determined based on precision of sub-pixel interpolation performed by using the first-type interpolation filter.

Second Implementation

In a process of performing inter prediction on the current encoding picture block, the video encoder may find an integer pixel reference block that optimally matches the current encoding picture block: perform sub-pixel interpolation on the integer pixel reference picture block by using each interpolation filter in the set of candidate interpolation filters to obtain N sub-pixel reference picture blocks, where N is a positive integer: determine, from the integer pixel reference picture block and the N sub-pixel reference picture blocks, a prediction block that optimally matches the current encoding picture block; and determine motion information based on the prediction block. When the motion information points to a fractional pixel position, the target interpolation filter is an interpolation filter of the prediction block obtained through interpolation or a type of interpolation filter of the prediction block obtained through interpolation. Otherwise, when the motion information points to an integer pixel position, the video encoder does not need to determine the target interpolation filter, and does not need to encode indication information of the target interpolation filter into the bitstream.

It can be understood that, in the process of performing inter prediction on the current encoding picture block, if the prediction block of the current encoding picture block is the integer pixel picture, the video encoder does not need to perform the process of determining the target interpolation filter, and does not need to encode the indication information of the target interpolation filter into the bitstream either.

In an embodiment of this application, the set of candidate interpolation filters may include the second interpolation filter obtained by using any one of the foregoing interpolation filter training methods.

Optionally, if the target interpolation filter is the second interpolation filter obtained by using any one of the foregoing interpolation filter training methods, a filter parameter of the target interpolation filter is a preset filter parameter, or a filter parameter of the target interpolation filter is the filter parameter obtained through online training by using any one of the foregoing interpolation filter training methods.

Further, the encoding information further includes the filter parameter of the target interpolation filter obtained through training: or the encoding information further includes a filter parameter difference, and the filter parameter difference is a difference between a filter parameter of a target interpolation filter that is used for a current picture unit and that is obtained through training and a filter parameter of a target interpolation filter that is used for a previously encoded picture unit and that is obtained through training.

A picture unit includes a picture frame, a slice (slice), a video sequence subgroup, a coding tree unit (CTU), a coding unit (CU), a prediction unit (PU), or the like. In other words, the video encoder may perform training once each time one picture block, one slice of picture block, one video sequence subgroup, one coding tree unit (CTU), one coding unit (CU), or one prediction unit (PU) is encoded.

When the picture unit is a prediction unit, the video encoder may use the current encoding picture block as a sample picture obtained each time to train the second interpolation filter in the set of candidate interpolation filters.

Figure 9:
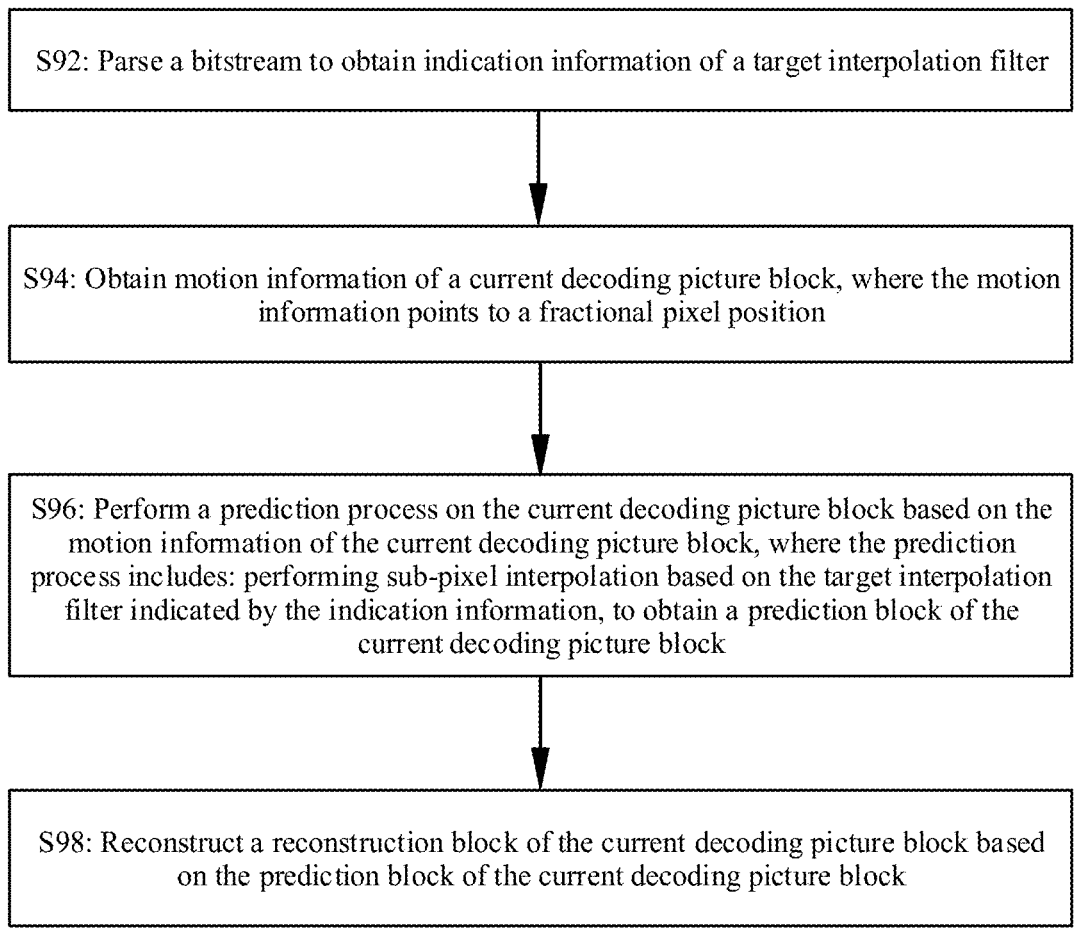
FIG. 9 is a schematic flowchart of a video picture decoding method according to an embodiment of this application.
Figure 10:
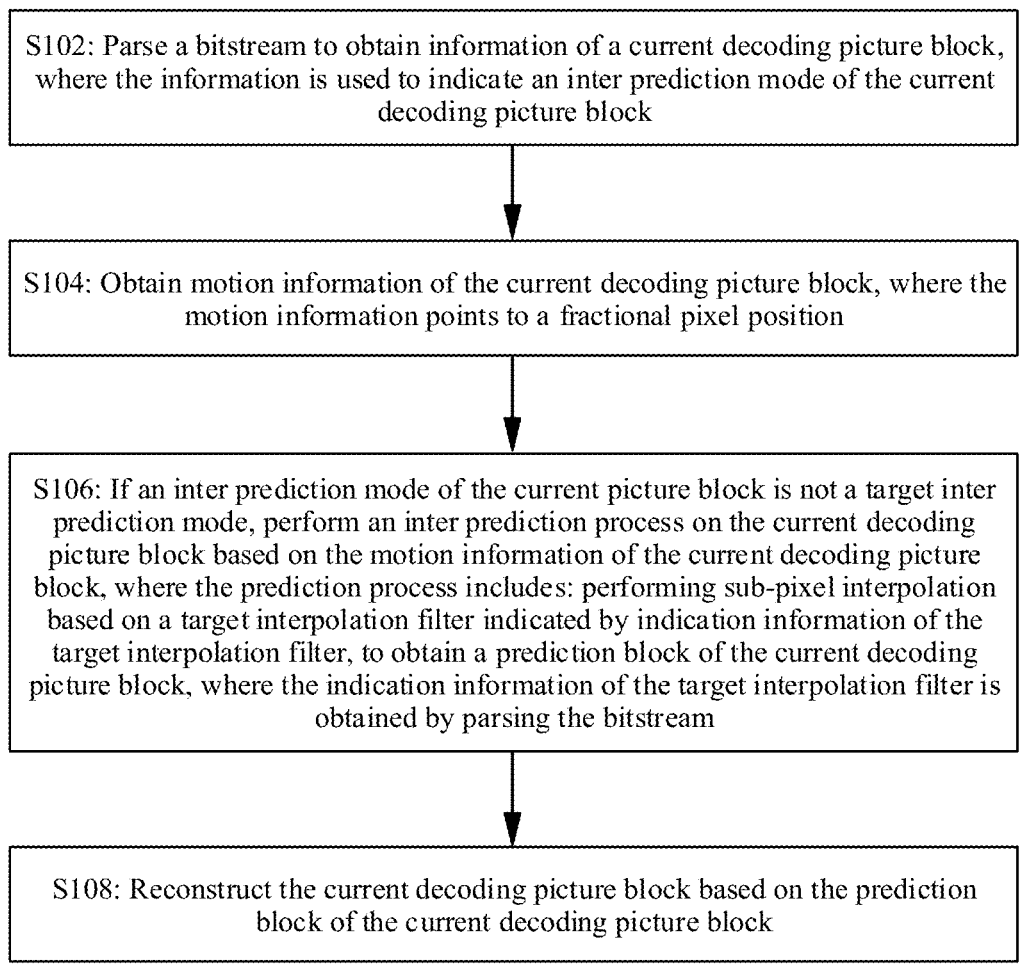
FIG. 10 is a schematic flowchart of another video picture decoding method according to an embodiment of this application.

Based on FIG. 9 and FIG. 10, the following describes two specific implementation processes of a video picture decoding method according to the embodiments of the present disclosure. The method may be performed by the video decoder 200. The method is described through a series of steps or operations. It should be understood that steps of the method may be performed in various sequences and/or at the same time, and are not limited to an execution sequence shown in FIG. 9 or FIG. 10.

FIG. 9 shows an implementation process of a video picture decoding method corresponding to the video picture encoding method shown in FIG. 7. The implementation process may include a part of or all the following steps.

S92: Parse a bitstream to obtain indication information of a target interpolation filter.

S94: Obtain motion information of a current decoding picture block, where the motion information points to a fractional pixel position.

S96: Perform a prediction process on the current decoding picture block based on the motion information of the current decoding picture block, where the prediction process includes: performing sub-pixel interpolation based on the target interpolation filter indicated by the indication information, to obtain a prediction block of the current decoding picture block.

S98: Reconstruct a reconstruction block of the current decoding picture block based on the prediction block of the current decoding picture block.

It should be noted that step S92 may be performed before or after step S94, or step S92 and step S94 may be performed at the same time. This is not limited in this embodiment of the present disclosure.

In this embodiment of this application, regardless of which inter prediction mode is used to obtain the bitstream, provided that the motion information points to the fractional pixel position, encoding information obtained by parsing the bitstream includes the indication information of the target interpolation filter. However, whether the encoding information obtained through parsing includes the motion information is related to the inter prediction mode. When the inter prediction mode is a merge mode, the video decoder may inherit motion information of a previously decoded picture block obtained through merging in the merge mode. When the inter prediction mode is a non-merge mode, the video decoder may parse the bitstream to obtain an index of the motion information of the current decoding picture block, or obtain, by parsing the bitstream, an index of the motion information of the current decoding picture block and a motion vector difference, to obtain the motion information.

When it is identified that the prediction mode of the current decoding picture block is the non-merge mode, an implementation of step S94 may include: The video decoder may parse the bitstream to obtain the index of the motion information of the current decoding picture block. Further, the motion information of the current decoding picture block is determined based on the index of the motion information of the current decoding picture block and a candidate motion information list of the current decoding picture block.

Optionally, another implementation of step S94 may include: The video decoder may parse the bitstream to obtain the index of the motion information of the current decoding picture block and the motion vector difference: determine a motion vector predictor of the current decoding picture block based on the index of the motion information of the current decoding picture block and a candidate motion information list of the current decoding picture block; and obtain a motion vector of the current decoding picture block based on the motion vector predictor and the motion vector difference.

When it is identified that the prediction mode of the current decoding picture block is the merge mode, an implementation of step S94 may include: The video decoder may inherit the motion information of the previously decoded picture block obtained through merging in the merge mode. It can be understood that the motion information of the previously decoded picture block is consistent with the motion information of the current decoding picture block.

Optionally, the video decoder may first perform S94 in which the video decoder obtains the motion information, of the current decoding picture block, that points to the fractional pixel position, and then perform step S92 in which the video decoder parses the bitstream to obtain the indication information of the target interpolation filter. It can be understood that, when the motion information points to an integer pixel position, the encoding information, obtained by parsing the bitstream, that corresponds to the current decoding picture block does not include the indication information of the target interpolation filter; or when the obtained motion information of the current decoding picture block points to an integer pixel position, the video decoder does not need to perform S92. In this case, prediction may be performed based on the obtained motion information.

FIG. 10 shows an implementation process of a video picture decoding method corresponding to the video picture encoding method shown in FIG. 8. The implementation process may include a part of or all the following steps.

S102: Parse a bitstream to obtain information of a current decoding picture block, where the information is used to indicate an inter prediction mode of the current decoding picture block.

S104: Obtain motion information of the current decoding picture block, where the motion information points to a fractional pixel position.

S106: If the inter prediction mode of the current decoding picture block is not a target inter prediction mode, perform an inter prediction process on the current decoding picture block based on the motion information of the current decoding picture block, where the prediction process includes: performing sub-pixel interpolation based on a target interpolation filter indicated by indication information of the target interpolation filter, to obtain a prediction block of the current decoding picture block, where the indication information of the target interpolation filter is obtained by parsing the bitstream.

S108: Reconstruct the current decoding picture block based on the prediction block of the current decoding picture block.

In this embodiment of this application, the inter prediction mode relates to following processing. During encoding, the indication information of the target interpolation filter needs to be encoded into the bitstream only when the inter prediction mode is not the target prediction mode (for example, a non-merge mode) and the motion information points to the fractional pixel position. When the inter prediction mode is a target inter prediction mode (for example, a merge mode), the motion information, an index of the motion information, a motion vector difference, and the indication information of the target interpolation filter do not need to be encoded into a bitstream. Correspondingly, on the decoder side, the indication information of the target interpolation filter needs to be obtained through parsing only when the inter prediction mode is not the target prediction mode (for example, the non-merge mode) and the motion information of the current decoding picture block points to the fractional pixel position. However, when the inter prediction mode is the target prediction mode (for example, the merge mode) and the motion information of the current decoding picture block points to the fractional pixel position, motion information that is of a previously decoded picture block and that is obtained through merging in the merge mode and the indication information of the target interpolation filter may be inherited.

If the inter prediction mode, obtained through parsing in step S102, of the current decoding picture block is not the target inter prediction mode (the non-merge mode), an implementation of step S104 may include: The video decoder may parse the bitstream to obtain an index of the motion information of the current decoding picture block, and determine the motion information of the current decoding picture block based on the index of the motion information of the current decoding picture block and a candidate motion information list of the current decoding picture block.

Optionally, another implementation of step S104 may include: The video decoder may parse the bitstream to obtain an index of the motion information of the current decoding picture block and a motion vector difference, determine a motion vector predictor of the current decoding picture block based on the index of the motion information of the current decoding picture block and a candidate motion information list of the current decoding picture block, and obtain a motion vector of the current decoding picture block based on the motion vector predictor and the motion vector difference.

Further, if the motion information of the current decoding picture block points to the fractional pixel position, the video decoder needs to parse the bitstream to obtain the indication information of the target interpolation filter. In a process of performing inter prediction, the video decoder needs to perform sub-pixel interpolation based on the target interpolation filter indicated by the indication information, to obtain the prediction block of the current decoding picture block. If the motion information of the current decoding picture block points to an integer pixel position, the video decoder directly obtains, based on the motion information, a prediction block to which the motion information points.

If the inter prediction mode, obtained through parsing in step S102, of the current decoding picture block is the target inter prediction mode (the merge mode), an implementation of step S104 may include: The video decoder may inherit the motion information, obtained through merging in the merge mode, of the previously decoded picture block.

Further, if the motion information of the current decoding picture block points to the fractional pixel position, the video decoder further needs to inherit indication information of an interpolation filter that is used by the previously decoded picture block during decoding, where the indication information of the interpolation filter is obtained through merging in the merge mode, and further determine the target interpolation filter indicated by the indication information. The video decoder needs to perform, during inter prediction, sub-pixel interpolation based on the target interpolation filter indicated by the indication information, to obtain the prediction block of the current decoding picture block. If the motion information of the current decoding picture block points to an integer pixel position, the video decoder directly obtains, based on the motion information, a prediction block to which the motion information points.

It should be understood that, in another embodiment of this application, when the inter prediction mode is the target inter prediction mode (for example, the merge mode) and the motion information points to the fractional pixel position, an encoder side may encode the indication information of the target interpolation filter. Correspondingly, when the inter prediction mode is the target inter prediction mode (for example, the merge mode) and the motion information points to the fractional pixel position, the decoder side may determine, based on the indication information that is obtained by parsing the bitstream and that is of the target interpolation filter, the target interpolation filter indicated by the indication information, so as to obtain, during inter prediction, the prediction block of the current decoding picture block through interpolation by using the target interpolation filter.

It should also be understood that, in step S106, the indication information may indicate to obtain the prediction block of the current decoding picture block through sub-pixel interpolation, or may indicate a type of target interpolation filter. If the indication information indicates the type of target interpolation filter, an implementation method for the video decoder to perform sub-pixel interpolation based on the target interpolation filter indicated by the indication information is as follows: The video decoder determines, based on the motion information and based on the type of target interpolation filter that is determined from the indication information, to obtain the target interpolation filter of the prediction block that is indicated by the motion information and that is obtained through sub-pixel interpolation.

In an embodiment of this application, if the target interpolation filter is a second interpolation filter obtained by using the foregoing interpolation filter training method, a filter parameter of the target interpolation filter on the video encoder side may be a preset filter parameter, and is consistent with the filter parameter of the target interpolation filter on the video decoder side. Alternatively, a filter parameter of the target interpolation filter on the video encoder side may be a filter parameter obtained by using the foregoing interpolation filter training method.

Optionally, corresponding to the encoder side, if the target interpolation filter is the second interpolation filter obtained through training, encoding information further includes a filter parameter of the target interpolation filter used for a current encoding picture unit. The video decoder on the decoder side may further parse the bitstream to obtain a filter parameter. The filter parameter may be a filter parameter of a target interpolation filter that is used for a current decoding picture unit and that is obtained by using the foregoing filter training method. Before the video encoder performs sub-pixel interpolation based on the target interpolation filter indicated by the indication information to obtain the prediction block of the current decoding picture block, the video encoder may further configure the target interpolation filter based on the filter parameter of the target interpolation filter used for the current decoding picture unit.

Optionally, corresponding to the encoder side, if the target interpolation filter is the second interpolation filter obtained through training, encoding information further includes a filter parameter difference. The video decoder on the decoder side may further obtain a filter parameter difference by parsing the bitstream. The filter parameter difference is a difference between a filter parameter of a target interpolation filter that is obtained through training and that is used for a current decoding picture unit and a filter parameter of a target interpolation filter that is obtained through training and that is used for a previously decoded picture unit. Before the video encoder performs sub-pixel interpolation based on the target interpolation filter indicated by the indication information to obtain the prediction block of the current decoding picture block, the video encoder may further obtain, based on the filter parameter difference and the filter parameter of the target interpolation filter used for the previously decoded picture unit, the filter parameter of the target interpolation filter used for the current decoding picture unit; and further configure the target interpolation filter based on the filter parameter of the target interpolation filter used for the current decoding picture unit.

In another embodiment of this application, the filter parameter of the target interpolation filter on the encoder side and the filter parameter of the target interpolation filter on the decoder side each may be fixedly a predicted filter parameter. In this case, encoding information may not include the filter parameter of the target interpolation filter or the filter parameter difference, and the decoder side does not need to parse the filter parameter of the target interpolation filter or the filter parameter difference.

Optionally, a picture unit is a picture frame, a slice (slice), a video sequence subgroup, a coding tree unit (CTU), a coding unit (CU), a prediction unit (PU), or the like. In other words, the video decoder updates the filter parameter at a required interval that is measured in a decoding picture unit.

Figure 11A:
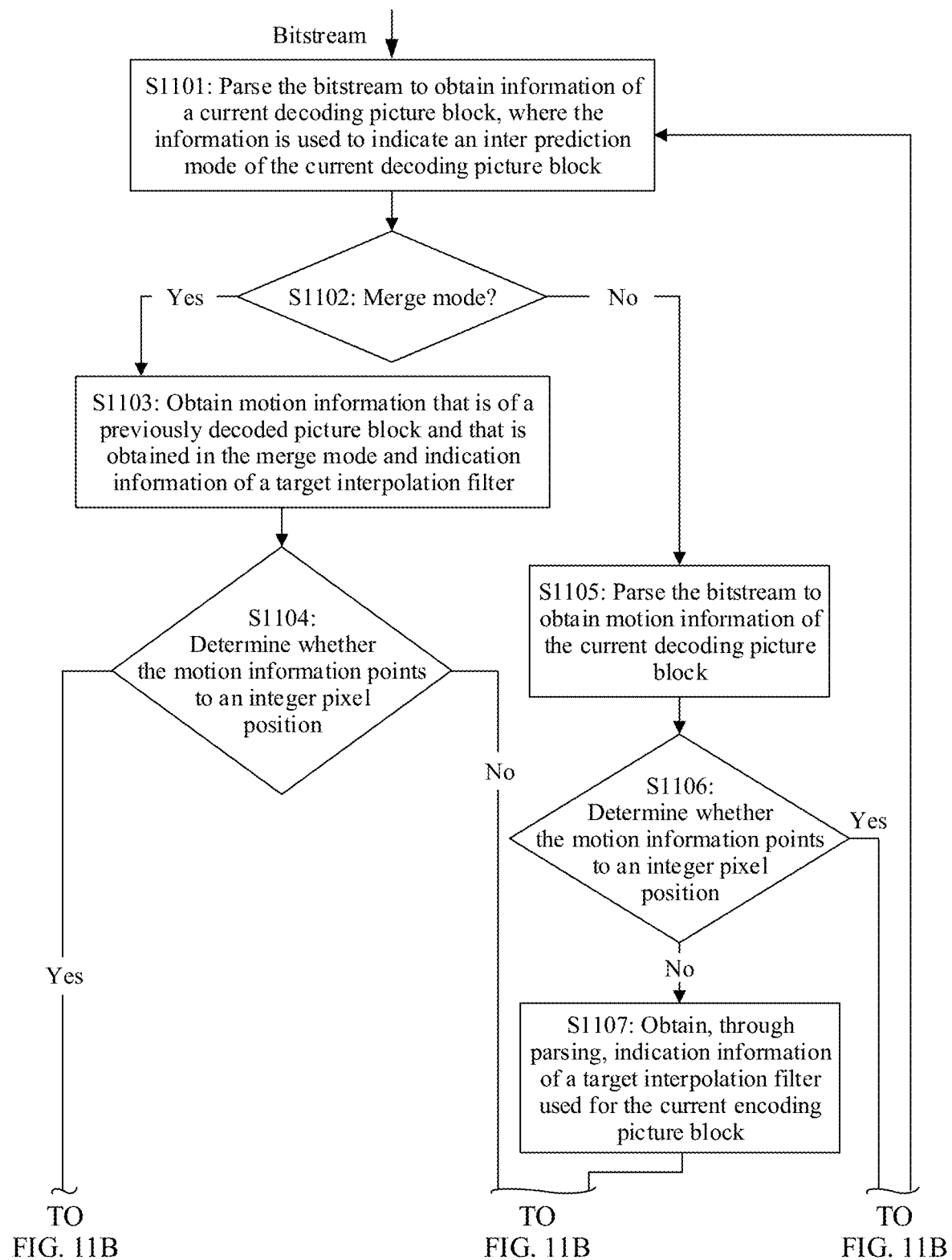
FIG. 11A and FIG. 11B are a schematic flowchart of still another video picture decoding method according to an embodiment of this application.
Figure 11B:
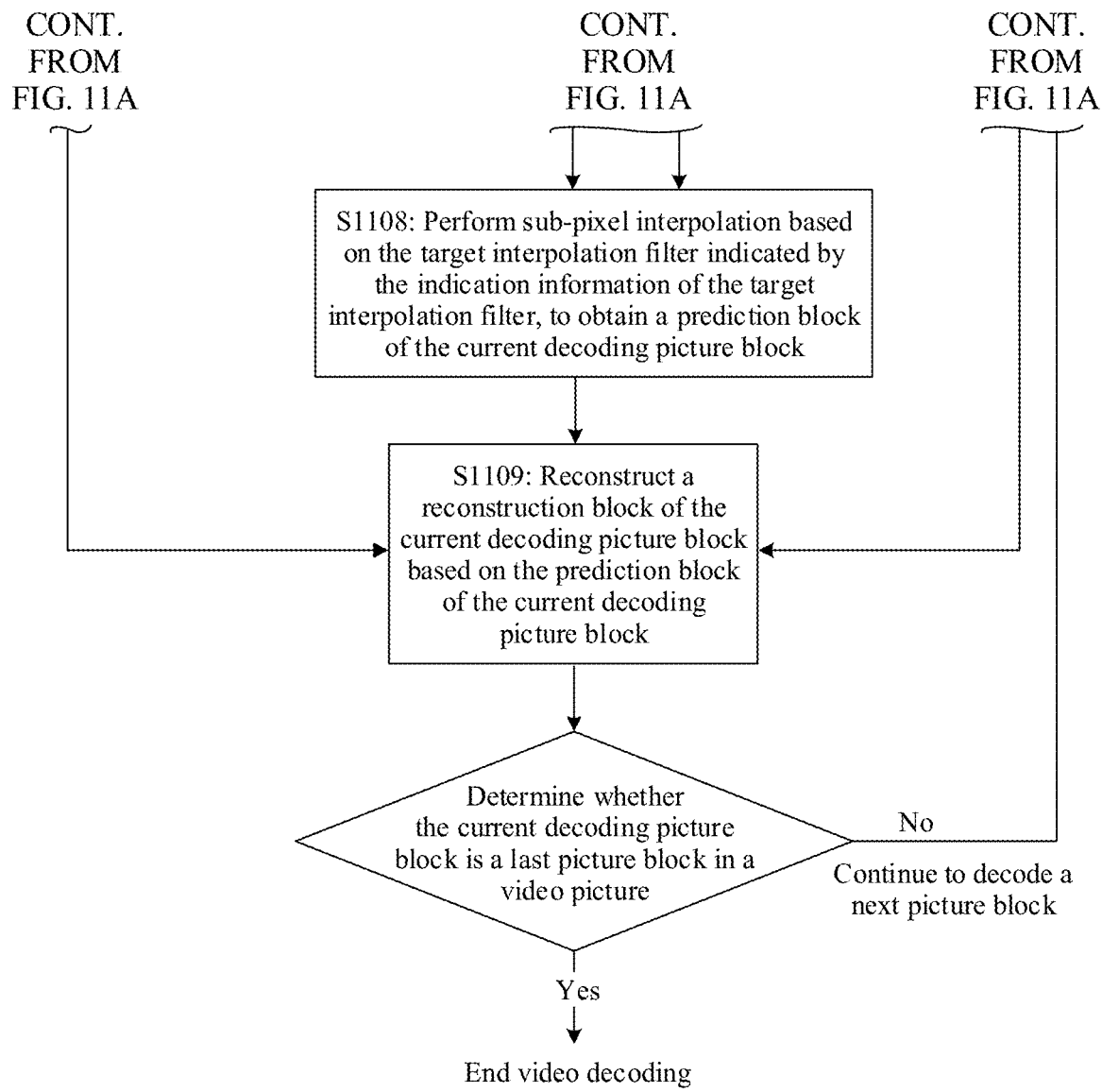

FIG. 11A and FIG. 11B are a schematic flowchart of still another video picture encoding method according to this application. The method may include but is not limited to a part of or all the following steps.

S1101: Parse a bitstream to obtain information of a current decoding picture block, where the information is used to indicate an inter prediction mode of the current decoding picture block.

S1102: Determine whether an inter prediction mode specified by the information that is used to indicate the inter prediction mode of the current decoding picture block is a merge mode.

If a determining result is yes, that is, if the inter prediction mode specified by the information that is used to indicate the inter prediction mode of the current decoding picture block is the merge mode, step S1103 is performed. Otherwise, if the inter prediction mode specified by the information that is used to indicate the inter prediction mode of the current decoding picture block is a non-merge mode, step S1105 is performed.

S1103: Obtain motion information that is of a previously decoded picture block and that is obtained in the merge mode and indication information of a target interpolation filter.

It should be understood that the motion information, obtained through merging in the merge mode, of the previously decoded picture block is motion information of the current decoding picture block.

S1104: Determine whether the motion information of the current decoding picture block points to an integer pixel position.

Step S1104 may be performed after step S1103. If a determining result in S1104 is yes, a picture block corresponding to the integer pixel position to which the motion information points is a prediction block of the current decoding picture block, and a video decoder may perform step S1109; otherwise, the video decoder performs step S1108.

S1105: Parse the bitstream to obtain motion information of the current decoding picture block.

S1106: Determine whether the motion information of the current decoding picture block points to an integer pixel position.

Step S1106 may be performed after step S1105. If a determining result in S1106 is yes, it indicates that a picture block corresponding to the integer pixel position to which the motion information points is a prediction block of the current decoding picture block, and the video decoder may perform step S1109: otherwise, it indicates that the prediction block of the current decoding picture block is a sub-pixel picture, and the video decoder performs step S1107.

S1107: Obtain, through parsing, indication information of a target interpolation filter used for the current decoding picture block.

S1108: Perform sub-pixel interpolation based on the target interpolation filter indicated by the indication information of the target interpolation filter, to obtain the prediction block of the current decoding picture block.

S1109: Reconstruct a reconstruction block of the current decoding picture block based on the prediction block of the current decoding picture block.

Further, the video decoder determines whether the decoded picture block in the foregoing process is a last picture block. If yes, the decoding process ends: otherwise, the decoding process may be performed on a next to-be-decoded picture block.

The following describes apparatuses used in the embodiments of the present disclosure.

Figure 12:
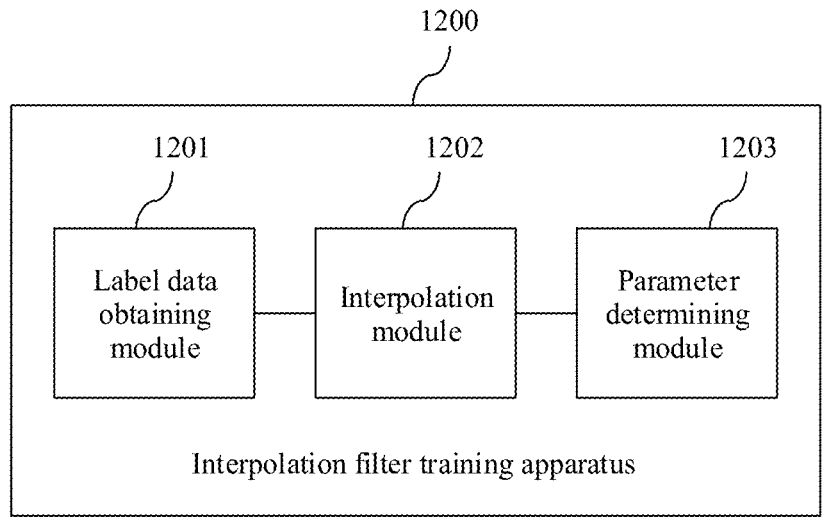
FIG. 12 is a schematic block diagram of an interpolation filter training apparatus according to an embodiment of the present disclosure.

FIG. 12 is a schematic block diagram of an interpolation filter training apparatus according to an embodiment of the present disclosure. It should be understood that the interpolation filter training apparatus 1200 may be disposed in the inter prediction unit in the encoder 100 or another unit in the encoder 100. It should be understood that training of an interpolation filter may be implemented by using a computing device. The computing device may be a computer, a server, or another component or device capable of implementing data processing. The interpolation filter 1200 may include but is not limited to a label data obtaining module 1201, an interpolation module 1202, and a parameter determining module 1203. Details are as follows:

The label data obtaining module 1201 is configured to perform interpolation on a pixel, of a sample picture, at an integer pixel position by using a first interpolation filter, to obtain a first sub-pixel picture of the sample picture at a first fractional pixel position.

The interpolation module 1202 is configured to input the sample picture into a second interpolation filter, to obtain a second sub-pixel picture.

The parameter determining module 1203 is configured to determine a filter parameter of the second interpolation filter by minimizing a first function that is used to represent a difference between the first sub-pixel picture and the second sub-pixel picture.

Figure 13:
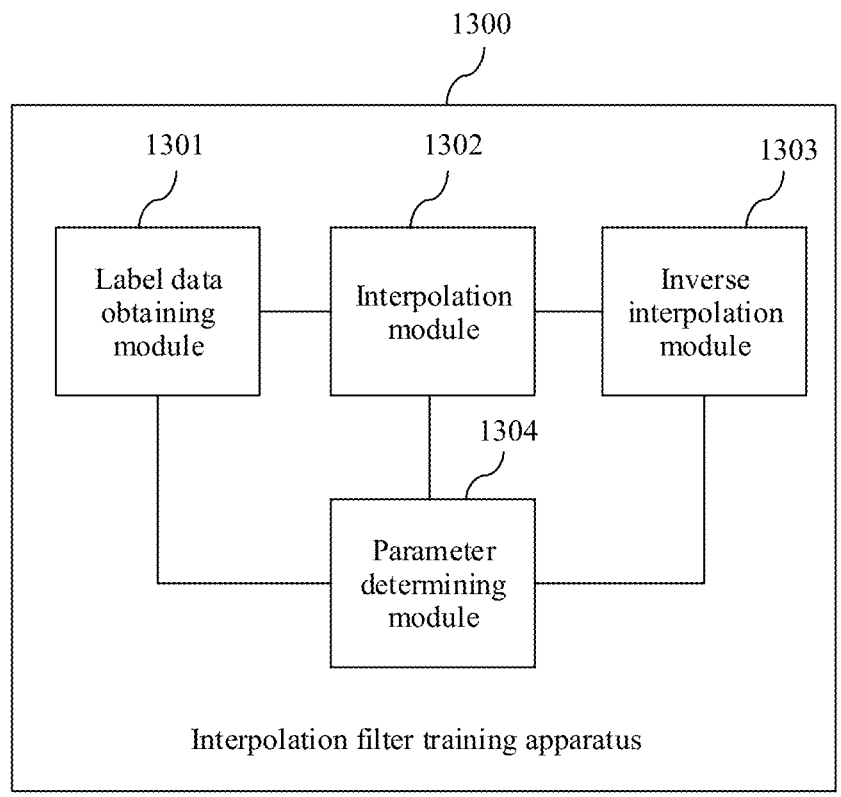
FIG. 13 is a schematic block diagram of an interpolation filter training apparatus according to an embodiment of the present disclosure.

FIG. 13 is a schematic block diagram of another interpolation filter training apparatus according to an embodiment of the present disclosure. The interpolation filter 1300 may include but is not limited to a label data obtaining module 1301, an interpolation module 1302, an inverse interpolation module 1303, and a parameter determining module 1304.

The label data obtaining module 1301 is configured to perform interpolation on a pixel, of a sample picture, at an integer pixel position by using a first interpolation filter, to obtain a first sub-pixel picture of the sample picture at a first fractional pixel position.

The interpolation module 1302 is configured to input the sample picture into a second interpolation filter, to obtain a second sub-pixel picture.

The inverse interpolation module 1303 is configured to input, to a third interpolation filter, the second sub-pixel picture on which a flipping operation is performed, to obtain a first picture, and perform an inverse operation of the flipping operation on the first picture to obtain a second picture, where the second interpolation filter and the third interpolation filter share a filter parameter.

The parameter determining module 1304 is configured to determine the filter parameter based on a first function that is used to represent a difference between the first sub-pixel picture and the second sub-pixel picture and a second function that is used to represent a difference between the sample picture and the second picture.

In a possible implementation, the parameter determining module 1304 is specifically configured to determine the filter parameter by minimizing a third function, where the third function is a weighted sum between the first function that is used to represent the difference between the first sub-pixel picture and the second sub-pixel picture and the second function that is used to represent the difference between the sample picture and the second picture.

In a possible implementation, the parameter determining module 1304 is specifically configured to determine the filter parameter by alternately minimizing a first loss function that is used to represent the difference between the first sub-pixel picture and the second sub-pixel picture and the second function that is used to represent the difference between the sample picture and the second picture.

Figure 14:
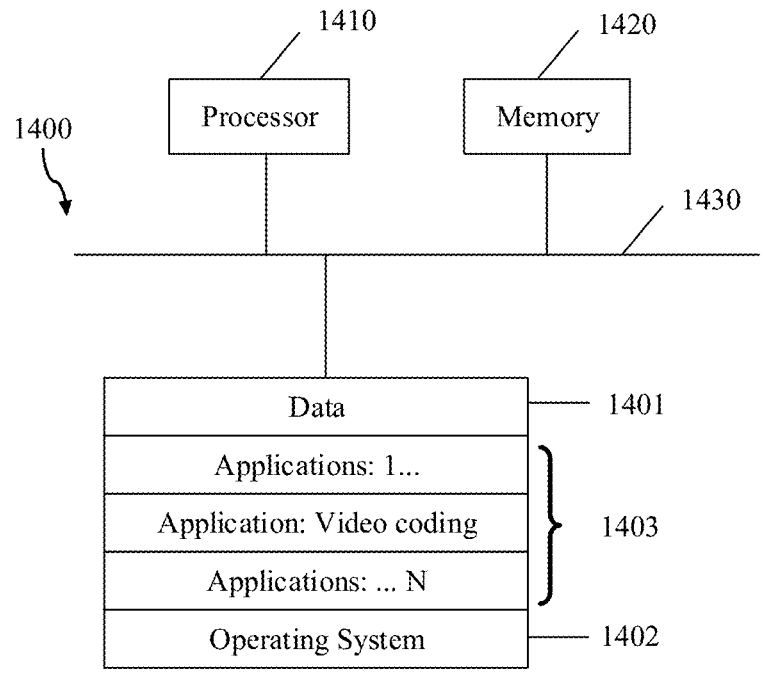
FIG. 14 is a schematic block diagram of another interpolation filter training apparatus according to an embodiment of the present disclosure.

FIG. 14 is a schematic block diagram of still another interpolation filter training apparatus according to an embodiment of this application. The apparatus 1400 may include a processor 1410 and a memory 1420. The memory 1420 is connected to the processor 1410 through a bus 1430, and the memory 1420 is configured to store program code used to implement any one of the foregoing interpolation filter training methods. The processor 1410 is configured to invoke the program code stored in the memory, to perform the interpolation filter training methods described in this application. For details, refer to related descriptions in the embodiments of the interpolation filter training methods in FIG. 6A to FIG. 6D. Details are not described again in this embodiment of this application.

The apparatus 1400 may be a computing system including a plurality of computing devices, or a single computing device, for example, a mobile phone, a tablet computer, a laptop computer, a notebook computer, a desktop computer, and the like.

A processor 1410 in the apparatus 1400 may be a central processing unit. Alternatively, the processor 1410 may be any other type of one or more existing/future-developed devices capable of controlling or processing information. As shown in FIG. 14, although the disclosed implementations can be practiced with a single processor such as the processor 1410, advantages in speed and efficiency can be achieved by using more than one processor.

In an implementation, the memory 1420 in the apparatus 1400 may be a read only memory (Read Only Memory, ROM) device or a random access memory (random access memory, RAM) device. Any other appropriate type of storage device can be used as the memory 1420. The memory 1420 may include code and data 1401 (for example, a sample picture) that is accessed by the processor 1410 through the bus 1430. The memory 1420 may further include an operating system 1402 and application programs 1403. The application programs 1403 include at least one program that allows the processor 1410 to perform the methods described in this specification. For example, the application programs 1403 may include applications 1 to N, and the applications 1 to N further include a video coding application that performs the method described in this specification. The apparatus 1400 may further include an additional memory in a form of a secondary memory 1402. The secondary memory 1402 may be, for example, a memory card used together with a mobile computing device. Because a video communication session may contain a large amount of information, all or a part of the information may be stored in the secondary memory 1420 and loaded, as required, into the memory 1420 for processing.

Optionally, the apparatus 1400 may further include but not limited to a communications interface or module and an input/output apparatus. The communications interface or module is configured to implement data exchange between the apparatus 1400 and another device (for example, an encoding device or a decoding device). The input apparatus is configured to implement inputting of information (such as texts, pictures, and sound) or instructions, and may include but is not limited to a touchscreen, a keyboard, a camera, and a recorder. The output apparatus is configured to implement outputting of information (such as texts, pictures, and sound) or instructions, and may include but is not limited to a display and a speaker. This is not limited in this application.

Figure 15:
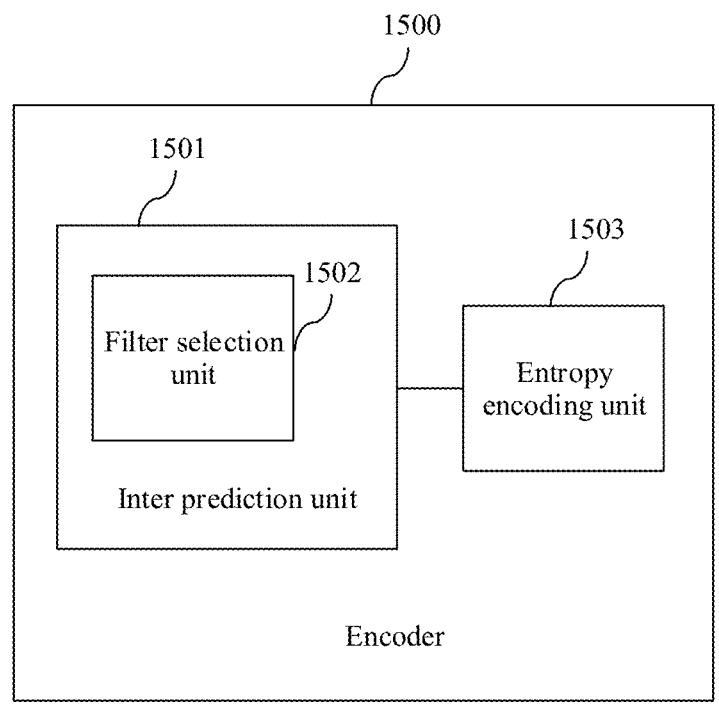
FIG. 15 is a schematic block diagram of another encoder according to an embodiment of this application.

FIG. 15 is a schematic block diagram of an encoder for implementing the video picture encoding method in FIG. 7 or FIG. 8 according to an embodiment of this application.

Corresponding to the video picture encoding method shown in FIG. 7, in an embodiment of this application, specific functions of units in the encoder 1500 are as follows:

An inter prediction unit 1501 is configured to perform inter prediction on a current encoding picture block to obtain motion information of the current encoding picture block, where the motion information of the current encoding picture block points to a fractional pixel position. The inter prediction unit includes a filter selection unit 1502, and the filter selection unit 1502 is specifically configured to determine, from a set of candidate interpolation filters, a target interpolation filter used for the current encoding picture block.

An entropy encoding unit 1503 encodes the current encoding picture block based on an inter prediction mode of the current encoding picture block and the motion information of the current encoding picture block to obtain encoding information, and encodes the encoding information into a bitstream, where the encoding information includes indication information of the target interpolation filter, and the indication information of the target interpolation filter is used to indicate to perform sub-pixel interpolation by using the target interpolation filter to obtain a reference block of a fractional pixel position corresponding to the current encoding picture block.

Corresponding to the video picture encoding method shown in FIG. 7, in another embodiment of this application, specific functions of units in the encoder 1500 are as follows:

An inter prediction unit 1501 is configured to perform inter prediction on a current encoding picture block to obtain motion information of the current encoding picture block, where the motion information of the current encoding picture block points to a fractional pixel position. The inter prediction unit includes a filter selection unit 1502, and the filter selection unit 1502 is configured to determine, from a set of candidate interpolation filters, a target interpolation filter used for the current encoding picture block.

An entropy encoding unit 1503 is configured to encode the current encoding picture block based on an inter prediction mode of the current encoding picture block and the motion information of the current encoding picture block to obtain encoding information, and encode the encoding information into a bitstream, where if the inter prediction mode of the current encoding picture block is a target inter prediction mode, the encoding information does not include indication information of the target interpolation filter: or if the inter prediction mode of the current encoding picture block is not a target inter prediction mode, the encoding information includes indication information of the target interpolation filter, where the indication information of the target interpolation filter is used to indicate that the current encoding picture block uses the target interpolation filter to perform sub-pixel interpolation.

In a possible implementation of this embodiment of this application, the filter selection unit 1502 is specifically configured to determine, from the set of candidate interpolation filters according to a rate-distortion cost criterion, the target interpolation filter used for the current encoding picture block.

In still another possible implementation of this embodiment of this application, the inter prediction unit 1501 is specifically configured to:
  determine an integer pixel reference picture block that optimally matches the current encoding picture block;
  perform sub-pixel interpolation on the integer pixel reference picture block by using each interpolation filter in the set of candidate interpolation filters, to obtain N sub-pixel reference picture blocks, where N is a positive integer:
  determine, from the integer pixel reference picture block and the N sub-pixel reference picture blocks, a prediction block that optimally matches the current encoding picture block; and
  determine the motion information based on the prediction block, where an interpolation filter that is used to obtain the prediction block through interpolation is the target interpolation filter.

In still another possible implementation of this embodiment of this application, the set of candidate interpolation filters includes the second interpolation filter obtained by using any one of the interpolation filter training methods described in FIG. 6A to FIG. 6D.

Optionally, if the target interpolation filter is the second interpolation filter obtained by using any one of the foregoing interpolation filter training methods described in FIG. 6A to FIG. 6D, a filter parameter of the target interpolation filter is a preset filter parameter, or a filter parameter of the target interpolation filter is the filter parameter obtained by using any one of the foregoing interpolation filter training methods described in FIG. 6A to FIG. 6D.

Further, the encoding information further includes the filter parameter of the target interpolation filter obtained through training: or the encoding information further includes a filter parameter difference, and the filter parameter difference is a difference between a filter parameter of a target interpolation filter that is used for a current picture unit and that is obtained through training and a filter parameter of a target interpolation filter that is used for a previously encoded picture unit and that is obtained through training.

Optionally, a picture unit includes a picture frame, a slice (slice), a video sequence subgroup, a coding tree unit (CTU), a coding unit (CU), or a prediction unit (PU).

Figure 16:
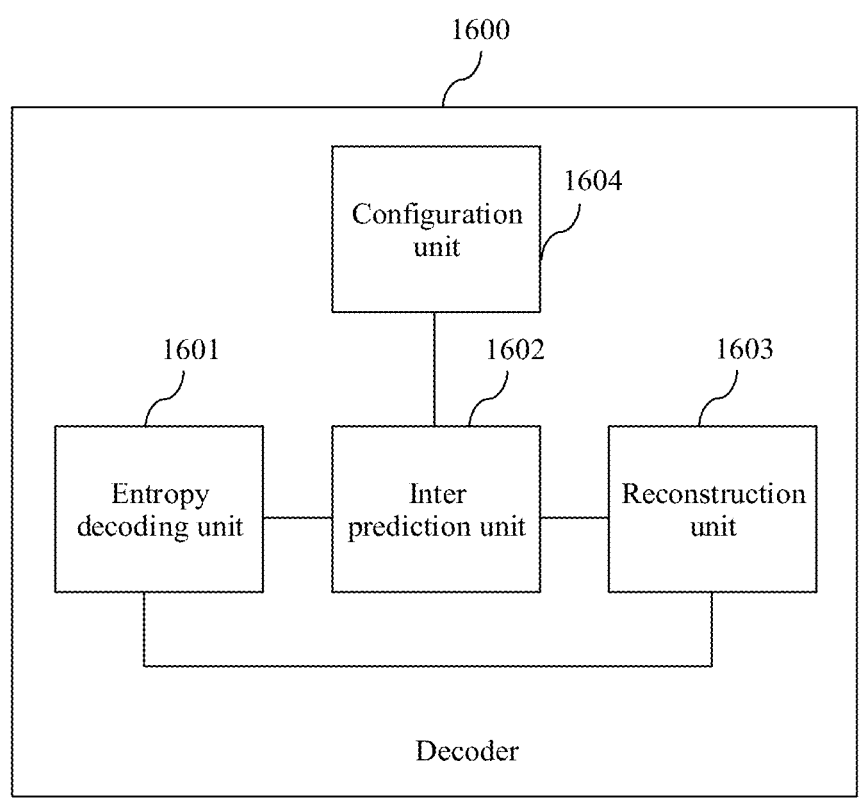
FIG. 16 is a schematic block diagram of another decoder according to an embodiment of this application.

FIG. 16 is a schematic block diagram of a decoder for implementing the video picture decoding method in FIG. 8 to FIG. 10 according to an embodiment of this application.

Corresponding to the video picture decoding method shown in FIG. 9, in an embodiment of this application, specific functions of units in the decoder 1600 are as follows:

An entropy decoding unit 1601 is configured to: parse a bitstream to obtain indication information of a target interpolation filter; and obtain motion information of a current decoding picture block, where the motion information points to a fractional pixel position.

An inter prediction unit 1602 is configured to perform a prediction process on the current decoding picture block based on the motion information of the current decoding picture block, where the prediction process includes: performing sub-pixel interpolation based on the target interpolation filter indicated by the indication information, to obtain a prediction block of the current decoding picture block.

A reconstruction unit 1603 is configured to reconstruct a reconstruction block of the current decoding picture block based on the prediction block of the current decoding picture block.

Corresponding to the video picture decoding method shown in FIG. 10 or FIG. 11A and FIG. 11B, in another embodiment of this application, specific functions of units in the decoder 1600 are as follows:

An entropy decoding unit 1601 is configured to parse a bitstream to obtain information of a current decoding picture block, where the information is used to indicate an inter prediction mode of the current decoding picture block.

An inter prediction unit 1602 is configured to: obtain motion information of the current decoding picture block, where the motion information points to a fractional pixel position; and if the inter prediction mode of the current decoding picture block is not a target inter prediction mode, perform a prediction process on the current decoding picture block based on motion information of the current decoding picture block, where the prediction process includes: performing sub-pixel interpolation based on a target interpolation filter indicated by indication information of the target interpolation filter, to obtain a prediction block of the current decoding picture block, where the indication information of the target interpolation filter is obtained by parsing the bitstream.

A reconstruction unit 1603 is configured to reconstruct the current decoding picture block based on the prediction block of the current decoding picture block.

Optionally, the inter prediction unit 1602 is further configured to: if the inter prediction mode of the current decoding picture block is a target inter prediction mode, perform a prediction process on the current decoding picture block based on the motion information of the current decoding picture block, where the prediction process includes: determining a target interpolation filter used for the current decoding picture block, and performing sub-pixel interpolation by using the target interpolation filter, to obtain a prediction block of the current decoding picture block.

It should be understood that, if the inter prediction mode of the current decoding picture block is the target inter prediction mode, that the inter prediction unit 1602 determines a target interpolation filter used for the current decoding picture block specifically includes: determining that an interpolation filter used for the previously decoded picture block in a decoding process is the target interpolation filter used for the current decoding picture block, or determining that the target interpolation filter used for the current decoding picture block is the target interpolation filter indicated by the indication information that is of the target interpolation filter and that is obtained by parsing the bitstream.

In a possible implementation of this embodiment of this application, the decoder 1600 obtains the motion information of the current decoding picture block in implementations, which may include but not limited to the following three implementations.

First Implementation

In not the target inter prediction mode (for example, a non-merge mode), the entropy decoding unit 1601 is specifically configured to parse the bitstream to obtain an index of the motion information of the current decoding picture block; and the inter prediction unit 1602 is further configured to determine the motion information of the current decoding picture block based on the index of the motion information of the current decoding picture block and a candidate motion information list of the current decoding picture block.

Second Implementation

In not the target inter prediction mode (for example, a non-merge mode), the entropy decoding unit 1601 is specifically configured to parse the bitstream to obtain an index of the motion information of the current decoding picture block and a motion vector difference; and the inter prediction unit 1602 is further configured to determine a motion vector predictor of the current decoding picture block based on the index of the motion information of the current decoding picture block and a candidate motion information list of the current decoding picture block, and obtain a motion vector of the current decoding picture block based on the motion vector predictor and the motion vector difference.

Third Implementation

In not the target inter prediction mode (for example, a non-merge mode), the entropy decoding unit 1601 is specifically configured to parse the bitstream to obtain an index of the motion information of the current decoding picture block and a motion vector difference; and the inter prediction unit 1602 is further configured to: determine a motion vector predictor of the current decoding picture block based on the index of the motion information of the current decoding picture block and a candidate motion information list of the current decoding picture block, and obtain a motion vector of the current decoding picture block based on the motion vector predictor and the motion vector difference.

In a possible implementation of this embodiment of this application, if the target interpolation filter is the second interpolation filter obtained by using any one of the foregoing interpolation filter training methods described in FIG. 6A to FIG. 6D, a filter parameter of the target interpolation filter is a preset filter parameter, or a filter parameter of the target interpolation filter is the filter parameter obtained by using any one of the foregoing interpolation filter training methods described in FIG. 6A to FIG. 6D.

In a possible implementation of this embodiment of this application, the entropy decoding unit 1601 is further configured to parse the bitstream to obtain a filter parameter of a target interpolation filter used for a current decoding picture unit; and the decoder 1600 further includes a configuration unit 1604, configured to configure the target interpolation filter by using the filter parameter of the target interpolation filter of the current decoding picture unit.

In a possible implementation of this embodiment of this application, the entropy decoding unit 1601 is further configured to parse the bitstream to obtain a filter parameter difference, where the filter parameter difference is a difference between a filter parameter of a target interpolation filter used for a current decoding picture unit and a filter parameter of a target interpolation filter used for a previously decoded picture unit; and the decoder further includes: a configuration unit 1604, configured to: obtain the filter parameter of the target interpolation filter of the current decoding picture unit based on the filter parameter of the target interpolation filter of the previously decoded picture unit and the filter parameter difference, and configure the target interpolation filter by using the filter parameter of the target interpolation filter of the current decoding picture unit.

Optionally, a picture unit includes a picture frame, a slice (slice), a video sequence subgroup, a coding tree unit (CTU), a coding unit (CU), or a prediction unit (PU).

Figure 17:
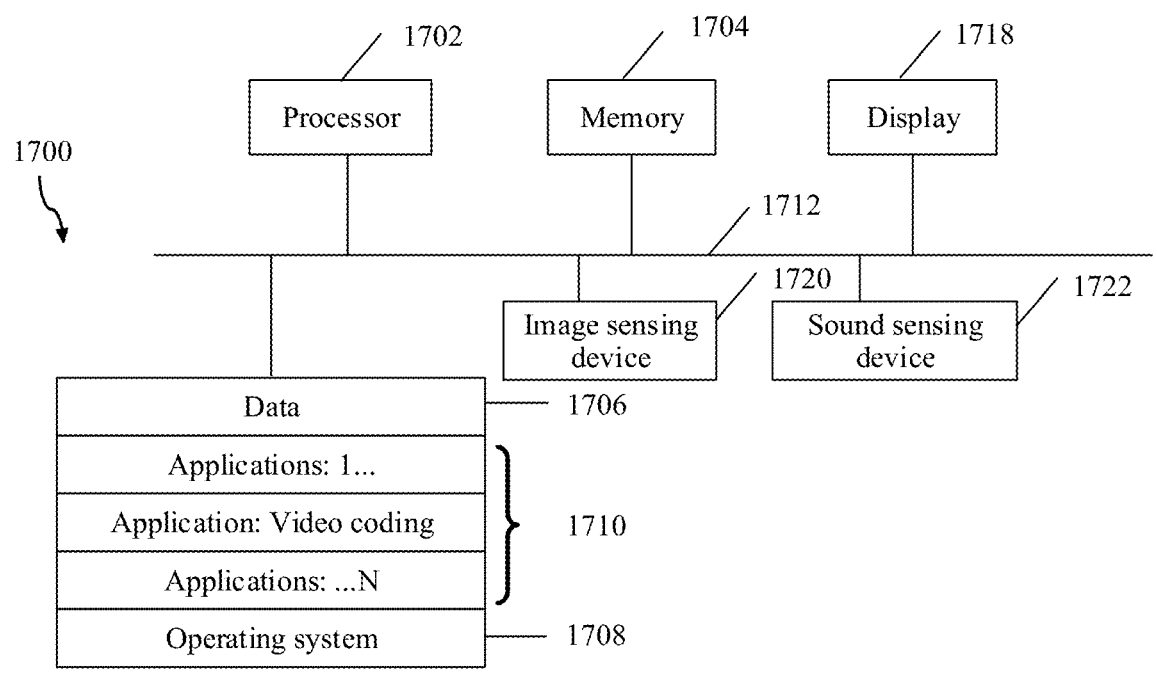
FIG. 17 is a schematic block diagram of an encoding device or a decoding device according to an embodiment of this application.

FIG. 17 is a schematic block diagram of an encoding device for implementing the video picture encoding method in FIG. 7 or FIG. 8 or a decoding device for implementing the video picture decoding method in FIG. 9 to FIG. 11B according to an embodiment of this application. The device 1700 may include a processor 1702 and a memory 1704, the memory 1704 is connected to the processor 1702 through a bus 1712. The memory 1704 is configured to store program code used to implement any one of the foregoing video picture encoding methods. The processor 1702 is configured to invoke the program code stored in the memory, to perform various video picture encoding/decoding methods described in this application. For details, refer to related descriptions in the method embodiments of the video picture encoding/ decoding methods in FIG. 7 to FIG. 11B. Details are not described again in this embodiment of this application.

The device 1700 may be a computing system including a plurality of computing devices, or a single computing device, for example, a mobile phone, a tablet computer, a laptop computer, a notebook computer, a desktop computer, and the like.

The processor 1702 in the device 1700 may be a central processing unit. Alternatively, the processor 1702 may be any other type of one or more existing/future-developed devices capable of controlling or processing information. As shown in the figure, although the disclosed implementations can be practiced with a single processor such as the processor 1702, advantages in speed and efficiency can be achieved by using more than one processor.

In an implementation, the memory 1704 in the device 1700 may be a read only memory (ROM) device or a random access memory (RAM) device. Any other appropriate type of storage device can be used as the memory 1704. The memory 1704 may include code and data 1706 that is accessed by the processor 1702 through the bus 1712. The memory 1704 may further include an operating system 1708 and application programs 1710. The application programs 1710 include at least one program that allows the processor 1702 to perform the methods described in this specification. For example, the application programs 1710 may include applications 1 to N, and the applications 1 to N further include a video coding application that performs the method described in this specification. The device 1700 may further include an additional memory in a form of a secondary memory 1714. The secondary memory 1714 may be, for example, a memory card used together with a mobile computing device. Because a video communication session may contain a large amount of information, all or a part of the information may be stored in the secondary memory 1714 and loaded, as required, into the memory 1704 for processing.

The device 1700 may further include one or more output devices, for example, a display 1718. In an example, the display 1718 may be a touchsensitive display that combines a display and a touch-sensitive element that operably senses touch input. The display 1718 may be coupled to the processor 1702 through the bus 1712. In addition to the display 1718, another output device that allows a user to program the device 1700 or otherwise use the device 1700 may further be provided, or another output device may be provided as an alternative to the display 1718. When the output device is or includes a display, the display may be implemented in various ways, including by using a liquid crystal display (LCD), a cathode-ray tube (CRT) display, a plasma display, or a light emitting diode (light emitting diode, LED) display such as an organic LED (OLED) display.

The device 1700 may further include an image sensing device 1720 or be in communication with the image sensing device 1720. The image sensing device 1720 is, for example, a camera or any other existing/future-developed image sensing device 1720 capable of sensing an image. The image is, for example, an image of a user that runs the device 1700. The image sensing device 1720 may be placed to directly face the user that runs the device 1700. In an example, a position and an optical axis of the image sensing device 1720 may be configured, so that a field of view of the image sensing device 1720 includes a neighboring region of the display 1718 and the display 1718 is visible from the region.

The device 1700 may further include a sound sensing device 1722 or be in communication with the sound sensing device 1722. The sound sensing device 1722 is, for example, a microphone or any other existing/future-developed sound sensing device capable of sending sound near the device 1700. The sound sensing device 1722 may be placed directly to face the user that runs the device 1700, and may be configured to receive sound, for example, a voice or other sound, made when the user runs the device 1700.

Although FIG. 17 depicts the processor 1702 and the memory 1704 of the device 1700 as being integrated into a single unit, other configurations may be utilized. Running of the processor 1702 may be distributed in a plurality of machines (each machine has one or more processors) that can be directly coupled to each other, or distributed in a local region or another network. The memory 1704 may be distributed across a plurality of machines, for example, the memory is a network-based memory or a memory in a plurality of machines in which the device 1700 runs. Although depicted here as a single bus, the bus 1712 of the device 1700 may include a plurality of buses. Further, the secondary memory 1714 may be directly coupled to other components of the device 1700 or can be accessed via a network. The secondary memory 1714 may include a single integrated unit such as a memory card or a plurality of units such as a plurality of memory cards. The device 1700 can thus be implemented in a wide variety of configurations.

In this specification, the processor may be a central processing unit (CPU), or the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or may be any conventional processor.

The memory may include a read-only memory (ROM) device or a random access memory (RAM) device. Any other appropriate type of storage device can also be used as the memory. The memory may include code and data accessed by the processor through the bus. The memory may further include an operating system and application programs. The application programs include at least one program that allows the processor to perform the video coding or decoding method described in this application (particularly the inter prediction method or the motion information prediction method described in this application). For example, the application program may include applications 1 to N, and further includes a video encoding or decoding application (video coding application for short) that performs the video encoding or decoding method described in this application.

The bus system may further include a power bus, a control bus, a status signal bus, and the like, in addition to a data bus. However, for clear description, various types of buses in the figure are marked as the bus system.

Optionally, the coding device may further include one or more output devices, for example, a display: In an example, the display may be a touchsensitive display that combines a display and a touch unit that operably senses touch input. The display may be connected to the processor through the bus.

A person skilled in the art can understand that, the functions described with reference to various illustrative logical blocks, modules, and algorithm steps disclosed and described in this specification can be implemented by hardware, software, firmware, or any combination thereof. If implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium, which corresponds to a tangible medium such as a data storage medium, or a communications medium including any medium that facilitates transfer of a computer program from one place to another (for example, according to a communication protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example but not limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or data structures and that can be accessed by a computer. In addition, any connection is properly termed a computer-readable medium. For example, if instructions are transmitted from a website, a server, or another remote source through a coaxial cable, an optical fiber, a twisted pair, a digital subscriber line (DSL), or wireless technologies such as infrared, radio, and microwave, the coaxial cable, the optical fiber, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included in the scope of the computer-readable media.

Instructions may be executed by one or more processors such as one or more digital signal processors (DSP), general-purpose microprocessors, application-specific integrated circuits (ASIC), field programmable logic arrays (FPGA), or other equivalent integrated circuit or discrete logic circuits. Therefore, the term "processor" used in this specification may be any of the foregoing structures or any other structure suitable for implementing the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of the apparatuses configured to perform the disclosed technologies, but are not necessarily implemented by different hardware units. Actually, as described above, various units may be combined into a codec hardware unit in combination with appropriate software and/or firmware, or may be provided by interoperable hardware units (including one or more processors described above).

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A video picture encoding apparatus, comprising:
a non-transitory memory containing instructions; and
a processor in communication with the memory and upon execution of the instructions, is configured to:
perform an inter prediction process on a current encoding picture block to obtain motion information of the current encoding picture block, wherein the motion information of the current encoding picture block points to a fractional pixel position, and the inter prediction process comprises: determining, from a set of candidate interpolation filters based on a prediction block of the current encoding picture block being not an integer pixel picture block, a target interpolation filter used for the current encoding picture block; and
encode the current encoding picture block based on an inter prediction mode of the current encoding picture block and the motion information of the current encoding picture block to obtain encoding information, and encode the encoding information into a bitstream, wherein the encoding information comprises indication information of the target interpolation filter, and the indication information of the target interpolation filter is used to indicate to perform sub-pixel interpolation by using the target interpolation filter to obtain a reference block of a fractional pixel position corresponding to the current encoding picture block, wherein the set of candidate interpolation filters comprise an interpolation filter obtained by training data that is obtained through an interpolation of the fractional pixel position by using another interpolation filter of the set of candidate interpolation filters.

2. The apparatus according to claim 1, wherein the processor is further configured to:
determine, from the set of candidate interpolation filters according to a rate-distortion cost criterion, the target interpolation filter used for the current encoding picture block.

3. The apparatus according to claim 1, wherein the processor is further configured to:
determine an integer pixel reference picture block that optimally matches the current encoding picture block;
perform sub-pixel interpolation on the integer pixel reference picture block by using each interpolation filter in the set of candidate interpolation filters, to obtain N sub-pixel reference picture blocks, wherein N is a positive integer;
determine, from the integer pixel reference picture block and the N sub-pixel reference picture blocks, a prediction block that optimally matches the current encoding picture block; and
determine the motion information based on the prediction block, wherein an interpolation filter that is used to obtain the prediction block through interpolation is the target interpolation filter.

4. A video picture decoding apparatus, comprising:
a non-transitory memory containing instructions; and
a processor in communication with the memory and upon execution of the instructions, is configured to:
parse a bitstream to obtain indication information of a target interpolation filter, wherein the target interpolation filter is determined from a set of candidate interpolation filters based on a prediction block of a current decoding picture block being not an integer pixel picture block, and wherein the target interpolation filter is used for the current decoding picture block;
obtain motion information of the current decoding picture block, wherein the motion information points to a fractional pixel position;
perform a prediction process on the current decoding picture block based on the motion information of the current decoding picture block, wherein the prediction process comprises: performing sub-pixel interpolation based on the target interpolation filter indicated by the indication information, to obtain the prediction block of the current decoding picture block; and
reconstruct a reconstruction block of the current decoding picture block based on the prediction block of the current decoding picture block, wherein the target interpolation filter is an interpolation filter obtained by training data that is obtained through an interpolation of the fractional pixel position by using another interpolation filter.

5. The apparatus according to claim 4, wherein the processor is further configured to:
parse the bitstream to obtain an index of the motion information of the current decoding picture block; and
determine the motion information of the current decoding picture block based on the index of the motion information of the current decoding picture block and a candidate motion information list of the current decoding picture block.

6. The apparatus according to claim 4, wherein the processor is further configured to:
parse the bitstream to obtain an index of the motion information of the current decoding picture block and a motion vector difference;
determine a motion vector predictor of the current decoding picture block based on the index of the motion information of the current decoding picture block and a candidate motion information list of the current decoding picture block; and
obtain a motion vector of the current decoding picture block based on the motion vector predictor and the motion vector difference.

7. The apparatus according to claim 4, wherein the processor is further configured to:
based on that an inter prediction mode of the current decoding picture block is a merge mode, obtain motion information that is of a previously decoded picture block and that is obtained through merging in the merge mode, that is, the motion information of the current decoding picture block.

8. A non-transitory computer-readable storage medium, comprising computer instructions that when executed by one or more processors, cause the one or more processors to perform the steps of:
parsing a bitstream to obtain indication information of a target interpolation filter, wherein the target interpolation filter is determined from a set of candidate interpolation filters based on a prediction block of a current decoding picture block being not an integer pixel picture block, and wherein the target interpolation filter is used for the current decoding picture block;
obtaining motion information of the current decoding picture block, wherein the motion information points to a fractional pixel position;
performing a prediction process on the current decoding picture block based on the motion information of the current decoding picture block, wherein the prediction process comprises: performing sub-pixel interpolation based on the target interpolation filter indicated by the indication information, to obtain the prediction block of the current decoding picture block; and
reconstructing a reconstruction block of the current decoding picture block based on the prediction block of the current decoding picture block, wherein the target interpolation filter is an interpolation filter obtained by training data that is obtained through an interpolation of the fractional pixel position by using another interpolation filter.

9. The medium according to claim 8, wherein the obtaining the motion information of the current decoding picture block comprises:
parsing the bitstream to obtain an index of the motion information of the current decoding picture block; and
determining the motion information of the current decoding picture block based on the index of the motion information of the current decoding picture block and a candidate motion information list of the current decoding picture block.

10. The medium according to claim 8, wherein the obtaining the motion information of the current decoding picture block comprises:
parsing the bitstream to obtain an index of the motion information of the current decoding picture block and a motion vector difference;
determining a motion vector predictor of the current decoding picture block based on the index of the motion information of the current decoding picture block and a candidate motion information list of the current decoding picture block; and
obtaining a motion vector of the current decoding picture block based on the motion vector predictor and the motion vector difference.

11. The medium according to claim 8, wherein the obtaining the motion information of the current decoding picture block comprises:
 based on that an inter prediction mode of the current decoding picture block is a merge mode, obtaining motion information that is of a previously decoded picture block and that is obtained through merging in the merge mode, that is, the motion information of the current decoding picture block.

* * * * *